(12) United States Patent
Sardina et al.

(10) Patent No.: US 11,132,376 B2
(45) Date of Patent: Sep. 28, 2021

(54) SYSTEM AND METHOD FOR MANAGEMENT OF A DATABASE SYSTEM

(71) Applicant: Walmart Apollo, LLC, Bentonville, AR (US)

(72) Inventors: Jason Christopher Sardina, Carlsbad, CA (US); William R. Eschenbruecher, III, Encinitas, CA (US); Jun Yi, San Marcos, CA (US); Yi Lu, San Diego, CA (US); Nitin Chhabra, III, San Diego, CA (US); Ying Zhang, San Diego, CA (US); Alexei Olkhovskii, Vista, CA (US); Robert Bruce Woods, III, Solana Beach, CA (US); Scott Melvin Harvester, San Marcos, CA (US); Robert Perry Lowell, Carlsbad, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 272 days.

(21) Appl. No.: 16/289,542

(22) Filed: Feb. 28, 2019

(65) Prior Publication Data

US 2019/0266169 A1 Aug. 29, 2019

Related U.S. Application Data

(60) Provisional application No. 62/636,257, filed on Feb. 28, 2018.

(51) Int. Cl.
*G06F 16/25* (2019.01)
*G06F 16/22* (2019.01)
(Continued)

(52) U.S. Cl.
CPC ........ *G06F 16/256* (2019.01); *G06F 16/2272* (2019.01); *G06F 16/2322* (2019.01); *G06F 16/2365* (2019.01); *G06F 16/2423* (2019.01)

(58) Field of Classification Search
CPC .............. G06F 16/256; G06F 16/2272; G06F 16/2322; G06F 16/2365; G06F 16/2423; G06F 16/2453
See application file for complete search history.

(56) References Cited

U.S. PATENT DOCUMENTS 3,768,402 A 10/1973 Levesque et al.
6,801,915 B1 * 10/2004 Mack .................. G06F 16/2365
(Continued)

FOREIGN PATENT DOCUMENTS

CN 101777057 9/2012
WO 2006090367 8/2006

OTHER PUBLICATIONS

Sidirourgos et al., "Column Imprints: A Secondary Index Structure", SIGMOD '13: Proceedings of the 2013 ACM SIGMOD International Conference on Management of Data—Jun. 2013 pp. 893-904 (Year: 2013).*

*Primary Examiner* — Mark D Featherstone
*Assistant Examiner* — Kweku William Halm
(74) *Attorney, Agent, or Firm* — Bryan Cave Leighton Paisner LLP

(57) ABSTRACT

A system can comprise one or more processors; and one or more non-transitory computer-readable media storing computing instructions configured to run on the one or more processors and perform: receiving a request for a write operation of an input record in a data store associated with a sharded database and an alternate-key-global-index (AKGI) database; generating a new optimistic lock value, the new optimistic lock value being unique in the sharded database; when the data store does not include a data record (Continued)

associated with the input record, creating the dummy data record in the data store; locking the data record for the write operation by setting the DROpLock of the data record to the new optimistic lock value; and performing the write operation of the input record in the AKGI database and the sharded database. In this embodiment, performing the writing operation further comprising inserting or updating an index record derived from the data record before updating the data record and locking the index record before inserting or updating the index record. Other embodiments are disclosed.

20 Claims, 22 Drawing Sheets

(51) Int. Cl.
*G06F 16/23* (2019.01)
*G06F 16/242* (2019.01)

(56) References Cited

U.S. PATENT DOCUMENTS

| | | |
|---|---|---|
| 8,571,882 B1 * | 10/2013 | Teitelbaum ......... G06F 12/0866 |
| | | 705/2 |
| 8,762,340 B2 | 6/2014 | Paksoy et al. |
| 9,754,008 B2 | 9/2017 | Genc et al. |
| 9,760,625 B2 | 9/2017 | Hazel et al. |
| 9,807,167 B2 | 10/2017 | Suman |
| 2006/0190243 A1 | 8/2006 | Barkai et al. |
| 2011/0252099 A1 * | 10/2011 | Pattekar ................. G06Q 10/10 |
| | | 709/206 |
| 2012/0041986 A1 | 2/2012 | Weissman et al. |
| 2012/0086544 A1 * | 4/2012 | Kemp ..................... G06F 16/23 |
| | | 340/5.1 |
| 2014/0164443 A1 | 6/2014 | Genc et al. |
| 2015/0317340 A1 * | 11/2015 | Sardina ................... G06F 16/22 |
| | | 707/803 |
| 2016/0171439 A1 | 6/2016 | Ladden et al. |
| 2016/0299936 A1 * | 10/2016 | Chavda .................. H04L 67/02 |
| 2016/0350392 A1 | 12/2016 | Rice et al. |
| 2018/0039936 A1 | 2/2018 | Klechner et al. |
| 2019/0019244 A1 | 1/2019 | Bangash |

\* cited by examiner

```
Class Operation {
    // (primaryKey, epoch, version) serves as global optimistic lock for a data
record operation involving index record changes
    Class IndexRecord {
        // the identifier of an IndexRecord is the "alternateKey" attribute/column
        String alternateKey; String primaryKey; UUID epoch; Long version;
    }
    Class DataRecord {
        // the identifier of a DataRecord is the "primaryKey" attribute/column, the
single val can be treated as a blob of multiple attributes/columns
        String primaryKey; UUID epoch; Long version; Set<String> alternateKeys;
Object val;
        // if a data record is empty (i.e., its payload is empty), it is purely an
optimistic lock
        boolean isEmpty() { (alternateKeys == null || alternateKeys.isEmpty()) &&
attributes == null ? return true : return false; }
        boolean hasAlternateKeys() { return alternateKeys != null &&
!alternateKeys.isEmpty();}
    }

DataRecord create(DataRecord dr) throws Exception {
        DataRecord latest_data_record = DataStore.read(dr.primaryKey);
        if(latest_data_record != null && !latest_data_record.isEmpty()) {
           //already exist
           return null;
        } else if(latest_data_record == null) {
           // data record absent
           (dr.epoch, dr.version) = (UUID.randomUUID(), 0);
           if(dr.hasAlternateKeys()) {
              return DataStore.insert(dr);
           }
           latest_data_record.opLock = DataStore.insert(new DataRecord(dr.pk,
dr.epoch, dr.version, null, null));
        } else {
           // an empty data record exists
           dr.epoch = latest_data_record.epoch;
           if(dr.alternateKeys == null || dr.alternateKeys.isEmpty()) {
              dr.version = latest_data_record.version + 1;
              return
DataStore.update(dr).onOptimisticLock(latest_data_record.epoch,
latest_data_record.version)
           }
        }
        if(!addAndUpdateIndexRecords(dr)) return null;
        dr.version = latest_data_record.version + 1;
        return DataStore.update(dr).onOptimisticLock(latest_data_record.epoch,
latest_data_record.version)
    }
```

FIG. 5

```
DataRecord update(DataRecord dr) throws Exception {
    DataRecord latest_data_record = DataStore.read(dr.primaryKey);
    // reject stale update
    if(latest_data_record == null || latest_data_record.isEmpty() || dr.epoch
!= latest_data_record.epoch && dr.version != latest_data_record.version) return null;
    // add additional derived index records to the index store if any (minus is
a standard set difference operator)
    if(dr.alternateKeys.minus(latest_data_record.alternateKeys) is-not empty) { if(!addAndUpdateIndexRecords(dr)) return null;
    }
    dr.version = latest_data_record.version + 1;
    return DataStore.update(dr).onOptimisticLock(latest_data_record.epoch,
latest_data_record.version)
}

DataRecord read(String ak) throws Exception {
    IndexRecord latest_index_record = IndexStore.read(ak);
    if(latest_index_record == null || latest_data_record.isEmpty()) return null;
    DataRecord latest_data_record =
DataStore.read(latest_index_record.primaryKey);
    if(ak in latest_index_record.alternateKeys) return latest_data_record;
    return null;
} boolean delete(String ak) throws Exception {
    DataRecord latest_data_record = read(ak);
    if(latest_data_record != null) {
        return
DataStore.delete(latest_data_record.primaryKey).onOptimisticLock(latest_data_record.ep
och, latest_data_record.version);
    }
    return false;
}
```

FIG. 6

```
boolean addAndUpdateIndexRecords(DataRecord dr) {
    for(String ak : dr.alternateKeys) {
        IndexRecord latest_index_record = IndexStore.read(ak);
        if(latest_index_record == null) {
            IndexStore.insert(new IndexRecord(ak, dr.primaryKey, dr.epoch, dr.version));
        } else if(latest_index_record.primaryKey == dr.primaryKey) {
            if (latest_index_record.epoch == dr.epoch) {
                // a newer copy of the index record exists
                if(latest_index_record.version > dr.version) return false;
                // an older copy of the index record with the same dynasty
                IndexStore.update(new IndexRecord(ak, dr.primaryKey, dr.epoch, dr.version)).onOptimisticLock(latest_index_record.epoch, latest_index_record.version);
            } else {
                DataRecord latest_data_record = DataStore.read(ir.primaryKey);
                // the epoch has been deleted or changed
                if(latest_data_record == null || latest_data_record.epoch != dr.epoch || latest_data_record.epoch != latest_index_record.epoch)return false;
                // an copy from the past dynasty
                IndexStore.update(new IndexRecord(ak, dr.primaryKey, dr.epoch, dr.version)).onOptimisticLock(latest_index_record.epoch, latest_index_record.version);
            }
        } else {
            // delete this index record if it is garbaged, and insert a new index record
            if(!verifyOwnershipAndMaybeCleanup(latest_index_record))return false;
            IndexStore.insert(new IndexRecord(ak, dr.primaryKey, dr.epoch, dr.version));
        }
    }
    return true;
}
```

FIG. 7

```
boolean verifyOwnershipAndMaybeCleanup(IndexRecord ir) {
    DataRecord latest_data_record = DataStore.read(ir.primaryKey);
    if(latest_data_record == null || latest_data_record.isEmpty()) {
        //with null alternateKeys and null val
        if(latest_data_record == null){
            latest_data_record = DataStore.insert(new
DataRecord(ir.primaryKey, UUID.randomUUID(), 0, null, null));
        } else {
            latest_data_record.version ++;
            latest_data_record =
DataStore.update(latest_data_record).onOptimisticLock(latest_data_record.epoch,
latest_data_record.version - 1)
        }
        IndexStore.delete(ir.alternateKey).onOptimisticLock(ir.epoch,
ir.version);
DataStore.delete(ir.primaryKey).onOptimisticLock(latest_data_record.epoch,
latest_data_record.version);
        return true;
    } else if(latest_data_record.alternateKeys == null || ir.alternateKey
not-in latest_data_record.alternateKeys) {
        latest_data_record.version++;
        latest_data_record =
DataStore.update(latest_data_record).onOptimisticLock(latest_data_record.epoch,
latest_data_record.version - 1)
        IndexStore.delete(ir.alternateKey).onOptimisticLock(ir.epoch,
ir.version);
        return true;
    }
```

FIG. 8

```
1   Class Operation {
2     Enum Status {Live, Dummy}
      // O_p > O_c iff O_p.ts > O_c.ts and O_p.cid = O_c.cid
3     Class OpID {int ts; int cid}
4     Class IR {String ak; String pk; OpID o}
5     Class DR {String pk; Set aks; OpID o; Status s; Column c}

// generate globally unique, per-client increasing sequence
6     OpID nextOpID() {return {nextTS(), clientID()}}

7     DR getByPK(String pk) {
8       if(DR dr = DataStore.get(pk)) {
9         if(dr.s == Live)return dr
10        async gcDR(dr) // best-effort cleanup dummy
11      }
12      return nil
13    }

14    DR getByAK(String ak) {
15      IR ir = IndexStore.get(ak)
16      if(ir && (DR dr = DataStore.get(ir.pk))) {
17        if(dr.s == Live && ak ∈ dr.aks)return dr
18      }
19      if(ir) async gcIR(ir) // read-collect garbage ir at best-effort
20      return nil
21    }
      // it is an insert if dr.o is nil, otherwise it is an update
22    bool put(DR dr) {
23      dr.s = Live
24      DR rdr = DataStore.get(dr.pk) // read reference data record
25      if(!rdr) {
26        if(dr.o ≠ nil)return false // late update a deleted one
27        dr.o = nextOpID()
28        if(dr.aks == ∅) { // directly insert with a new OpID
29          return DataStore.insert(dr)
30        }
          // insert a dummy as reference data record
31        rdr = {dr.pk, ∅, dr.o, Dummy, nil}
32        if(!DataStore.insert(rdr))return false
33      }
34      if(dr.o ≠ nil && rdr.o ≠ dr.o)return false // stale update
35      if(dr.o == nil && rdr.s == Live)return false // stale insert
36      dr.o = nextOpID()
37      for(ak ∈ (dr.aks \ rdr.aks)) // persist irs in parallel
38        if(!persistIR({ak, dr.pk, dr.o}))return false
39      if(DataStore.condUpdate(dr, rdr.o)) {
          // best-effort garbage collect in parallel
40        async for(ak ∈ (rdr.aks \ dr.aks))
41          if(IR gir = IndexStore.get(ak))gcIR(gir)
42        return true
43      }
44      return false
45    }
```

FIG. 19

```
46  bool persistIR(IR ir) {
47      IR rir = IndexStore.get(ir.ak)
48      if(!rir)return IndexStore.insert(ir)
49      if(rir.pk == ir.pk) {
            // an ongoing collector may delete rir, update to ir
50          if(rir.o < ir.o)return IndexStore.condUpdate(ir, rir.o)
51      } else {
            // collect suspected ir before reusing its ak
52          if(gcIR(rir))return IndexStore.insert(ir)
53      }
54      return false
55  }

56  bool deleteByPK(String pk) {
57      if(DR dr = DataStore.get(pk))return deleteByDR(dr)
58      return true
59  }

60  bool deleteByAK(String ak) {
61      if(IR ir = IndexStore.get(ak)) {
62          if((DR dr = DataStore.get(ir.pk)) && ak ∈ dr.aks) {
63              return deleteByDR(dr)
64          }
65          async gcIR(ir)
66      }
67      return false
68  }

69  bool deleteByDR(DR dr) {
70      if(DataStore.condDelete(dr, dr.o)) {
71          async for(ak ∈ dr.aks)
72              if(IR gir = IndexStore.get(ak))gcIR(gir)
73          return true
74      }
75      return false
76  }

77  void gcDR(DR dr) {
78      if(dr.s == Dummy) DataStore.condDelete(dr, dr.o)
79  }

80  bool gcIR(IR ir) {
81      DR dr = DataStore.get(ir.pk)
82      if(dr && ir.ak ∈ dr.aks)return false // valid ir
83      if(!dr || dr.o > ir.o) {
            // the persistor of ir was effectively aborted, delete ir
84          return IndexStore.condDelete(ir, ir.o)
85      } else {
            // delete ir only after effectively aborting the persistor
86          OpID o = dr.o
87          dr.o = nextOpID()
88          if(!DataStore.condUpdate(dr, o))return false
89          return IndexStore.condDelete(ir, ir.o)
90      }
91      return false
92  }
93  }
```

FIG. 20 ial Patent

SYSTEM AND METHOD FOR MANAGEMENT OF A DATABASE SYSTEM

CROSS-REFERENCE TO RELATED APPLICATIONS

This application claims priority to U.S. Provisional Patent Application No. 62/636,257, filed Feb. 28, 2018. U.S. Provisional Patent Application No. 62/636,257 is incorporated herein by reference in its entirety.

TECHNICAL FIELD

This disclosure relates generally to managing a sharded database.

BACKGROUND

Monolithic databases cannot meet the sheer needs of large-scale business applications, such as online order systems, inventory systems, or customer management systems for a general retailer, a department store, or an online marketplace. A partitioned/sharded database table (and/or its descendant tables) can horizontally scale across multiple physical database servers, by hashing the primary key of a record into one or more database server identifiers and persisting the record (and/or its descendant records) to the corresponding database servers. In such a sharded data store, applications can still rapidly get/put/delete records by primary keys (PKs). Unlike typical key-value stores where most services only need primary-key access, many business applications need to rapidly access data records by one or more secondary keys/indexes, such as email address or phone number, and in many business applications, no two records share the same secondary indexes. Here, such business rule is called "uniqueness enforcement for global secondary indexes" and a global secondary index with uniqueness enforcement is referred to as "global alternate key" or just "alternate key."

However, implementing such global secondary indexes with uniqueness enforcement is challenging in distributed or sharded databases. Without suitable control, data records in different shards of the same data store can be concurrently persisted with the same secondary index, resulting into corrupted data. Therefore, systems and methods for enforcing uniqueness for global secondary indexes in sharded databases in simple, non-blocking, scalable, and deployable manners are desired.

BRIEF DESCRIPTION OF THE DRAWINGS

To facilitate further description of the embodiments, the following drawings are provided in which:

FIGS. 5-8 illustrate an exemplary program to be executed for creating, reading, writing, and deleting data records in a sharded database and/or index records in an index store, according to an embodiment;

FIGS. 19-20 illustrate an exemplary program to be executed for creating, reading, writing, and deleting data records in a sharded database and/or index records in an index store, according to an embodiment;

Figure 1:
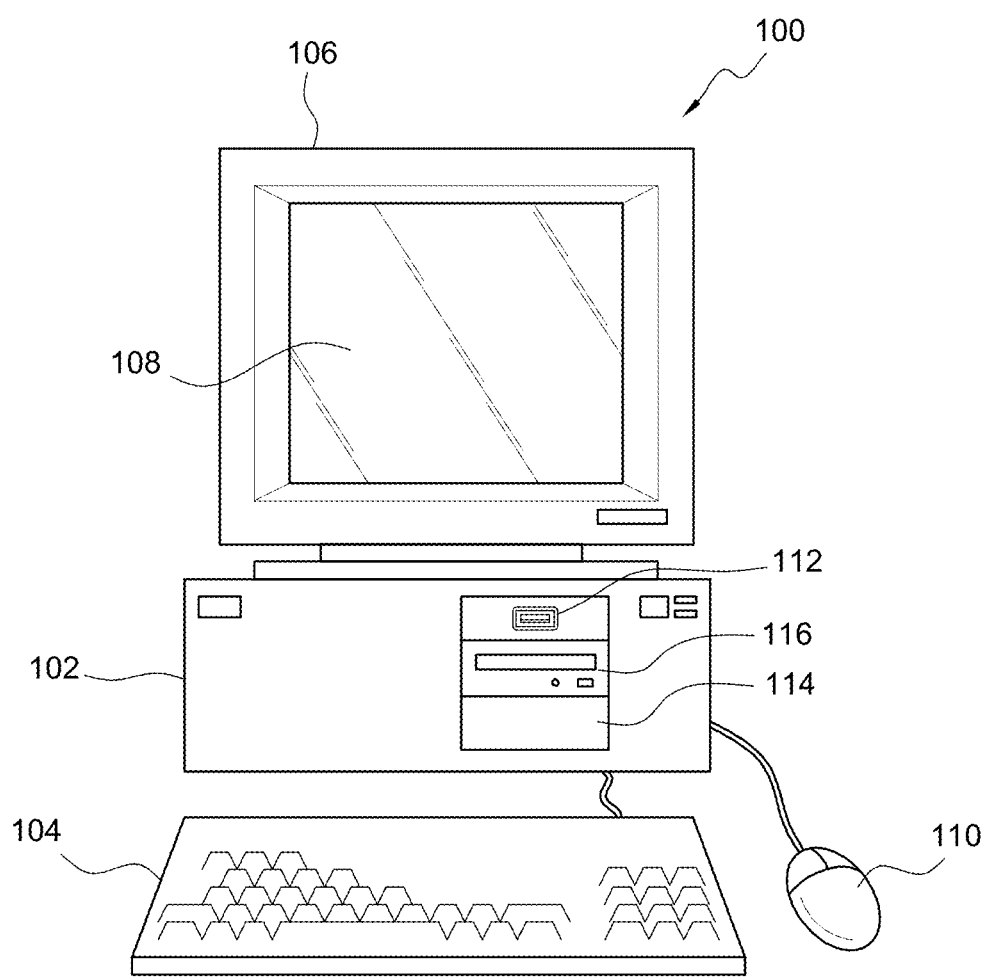
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, ten seconds, thirty seconds, one minute, five minutes, ten minutes, one hour, six hours, twelve hours, or twenty-four hours.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
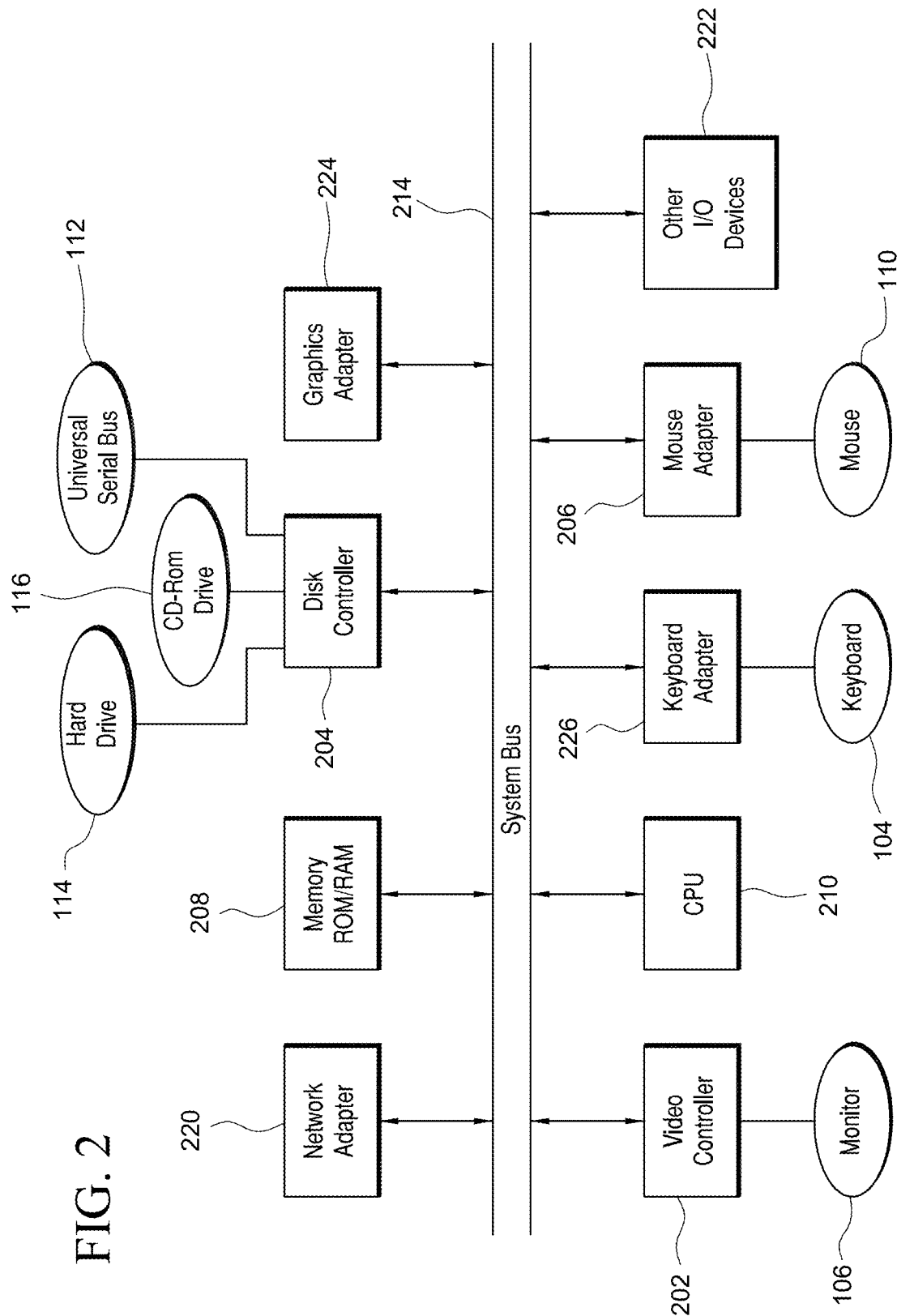
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein and/or operating part or all of one more embodiments of the memory storage modules described herein. As an example, a different or separate one of a computer system 100, all of which or a portion of which can be suitable for (i) implementing part or all of one or more embodiments of the techniques, methods, and systems and/or (ii) implementing and/or operating part or all of one or more embodiments non-transitory computer readable media described herein. As an example, a different or separate one of computer system 100 (and its internal components, or one or more elements of computer system 100) can be suitable for implementing part or all of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

When computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
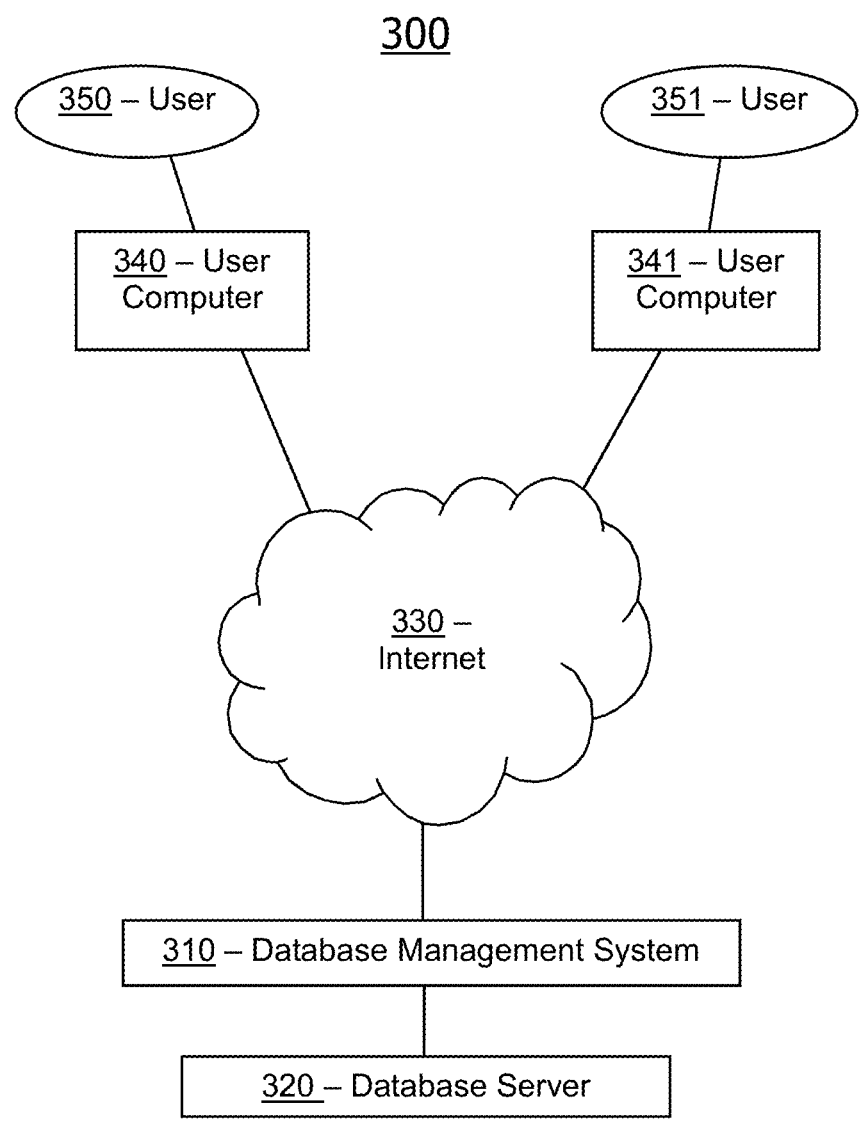
FIG. 3 illustrates a system for database management, according to an embodiment.

Turning ahead in the drawings, FIG. 3 illustrates a block diagram of a system 300 that can be employed for managing a database, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a database management system 310 and a database server 320. Database management system 310 and/or database server 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of database management system 310, database server 320, and/or one or more user computers 340 and 341. Additional details regarding database management system 310, database server 320, and/or one or more user computers 340 and 341 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, database management system 310 can be in data communication through Internet 330 with user computers (e.g., 340, 341). In certain embodiments, user computers 340-341 can be desktop computers, laptop computers, smart phones, tablet devices, and/or other endpoint devices. Database management system 310 can further comprise a web server that can host one or more websites. For example, database management system 310 can host an eCommerce website that allows users to browse and/or search for products, to add products to an electronic shopping cart, and/or to purchase products, in addition to other suitable activities.

In many embodiments, database management system 310 and/or database server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) database management system 310 and/or database server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of database management system 310 and/or database server 320. In a similar manner, the processing module(s) and the memory storage module(s) can be local and/or remote to each other.

In many embodiments, database management system 310 and/or database server 320 can be configured to communicate with one or more user computers 340 and 341. In some embodiments, user computers 340 and 341 also can be referred to as customer computers. In some embodiments, database management system 310 and/or database server 320 can communicate or interface (e.g., interact) with one or more customer computers (such as user computers 340 and 341) through a network or internet 330. Internet 330 can be an intranet that is not open to the public. Accordingly, in many embodiments, database management system 310 and/or database server 320 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, database server 320 can comprise one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between database management system 310 and database server 320 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
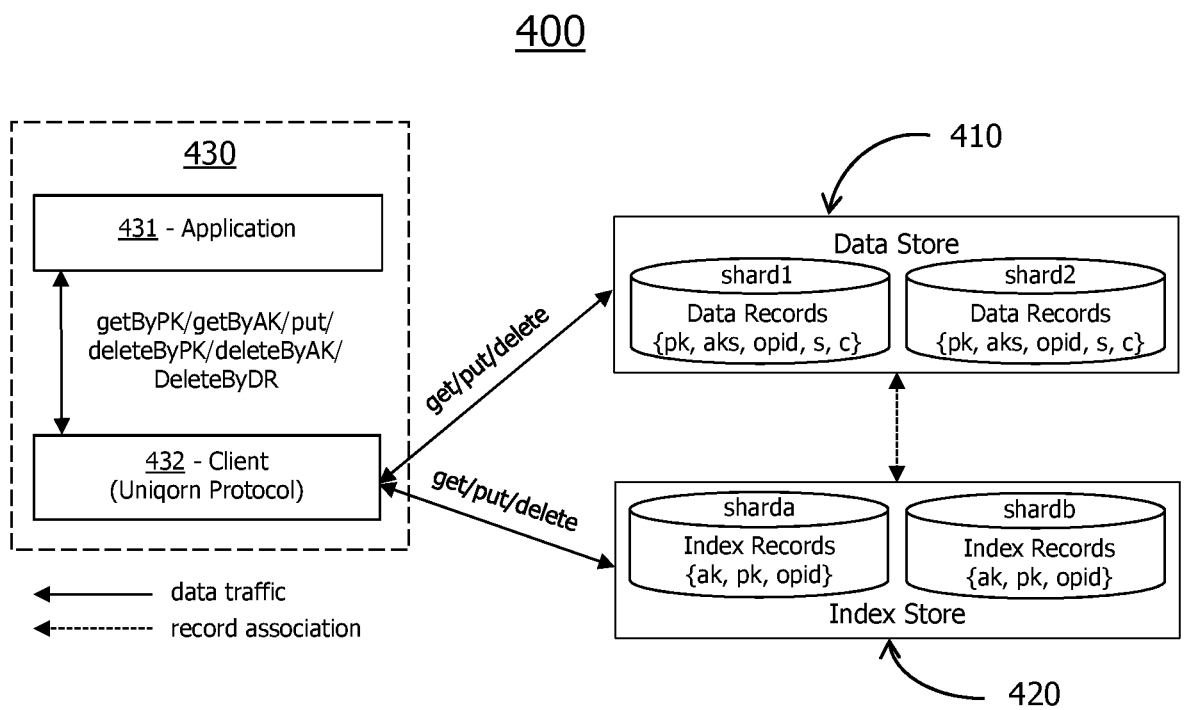
FIG. 4 illustrates a system for managing a sharded database, according to another embodiment.

Turning ahead in the drawings, FIG. 4 illustrates a block diagram of a system 400 that can be employed for accessing data records in a sharded database, as described in greater detail below. System 400 is merely exemplary and embodiments of the system are not limited to the embodiments presented herein. System 400 can be employed in many different embodiments or examples not specifically depicted or described herein. In some embodiments, certain elements or modules of system 400 can perform various procedures, processes, and/or activities. In these or other embodiments, the procedures, processes, and/or activities can be performed by other suitable elements or modules of system 400.

Generally, therefore, system 400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 400 described herein.

In some embodiments, system 400 can include data store 410, index store 420, and one or more client systems 430. For various reasons, such as manageability, performance, availability, and/or load balancing, logical databases, or their constituent elements, can be divided into distinct independent parts and be saved across multiple physical databases. In many embodiments, data store 410 can be configured to split data records, such as customer data or transaction records, based on the primary keys of the data records, such as unique customer IDs or transaction serial numbers, and store the data records into more than one shards/partitions of a sharded database. In many embodiments, index store 420 can be configured to store index records, including global secondary indexes. In some embodiments, the index records in index store 420 also can be divided and saved in the sharded database.

In some embodiments, client systems 430 can each comprise an application, such as application 431, configured to read, create, update, and/or delete data through a client, such as client 432, configured to get, put, and/or delete data records in the data store 410. In some embodiments, application 431 can be a web server configured to host one or more websites, such as eCommerce website, for example. In some embodiments, client 432 can comprise a database management system, such as database management system 310 (FIG. 3).

Furthermore, data store 410, index store 420, and client systems 430 can each be a computer system, such as computer system 100 (FIG. 1), as described above, and can each be a single computer, a single server, or a cluster or collection of computers or servers, or a cloud of computers or servers. In some embodiments, application 431 and client 432 can each be an independent computer or system. In another embodiment, a single computer system can host each of two or more of data store 410, an index store 420, and one or more client systems 430.

The following terminology is used throughout this disclosure:

Data Record: A data record can be a logical key-value pair of (primaryKey, value) where its value may consist of all of its alternate keys and/or other columns/attributes. A data record can be viewed as a single logic row with a primary key in relational database, which can be physically stored into multiple tables. Data records can be stored in data store, such as data store 410. The each data record may contain zero, one, and/or multiple alternate keys.

Data Store: A data store, such as data store 410, can be a centralized and/or distributed database where data records are persisted. If data store can be distributed across multiple database servers, a data record can be persisted into one or more database servers determined by its primary key.

Index Store: An index store, such as index store 420, can be a centralized and/or distributed database where global alternate keys of data records are persisted. Data store and/or index store can be logically separated, but can also be physically consolidated. If index store is distributed across multiple database servers, an index record can be persisted into one or more database servers determined by its alternate key.

Index Record: An index record can be a key-value pair of (alternateKey, primaryKey) where the primaryKey refers to the corresponding data record in data store. Some index records can be persisted in index store. When the term primary key is used, the term generally refers to primaryKey component of a data record or an index record. A data record can be retrieved by its alternate key: by querying the index store to obtain the primary key, and/or querying the data store via the primary key. An index record refers to a data record when the data record has the same primary key as the index record. A data record derives an index record when the index record refers to the data record and the data record has the alternate key of the index record.

Client: A client, such as client 432, can comprise binary library or proxy configured to implement a transactional CRUD (create, read, update, delete) APIs (application programming interfaces) to access the data store and the index store. A client can be embedded in an application, such as application 431, deployed standalone in a hardware and/or software system, or consolidated with database servers. In embodiments as illustrated in FIG. 4, through a client, such as client 432, a data store, such as data store 410, and an index store, such as index store 420, whether they be distributed or centralized, can appear to an application, such as application 431, as a single logical database.

Application: By calling CRUD APIs provided by a client, such as client 432, an application can be configured to implement its own business logic without concerns of the data store consistency and integrity.

As stated above, implementing global secondary indexing with uniqueness enforcement is challenging in distributed, sharded databases, due to at least the following two factors: unreliability of distributed system caused by varied speeds between/among networks, clients (e.g., user computers 340 and 341 (FIG. 3), and client systems 430), and/or systems (e.g. database management system 310 (FIG. 3) and a database server 320 (FIG. 3)) and various conflicting operations over the same data record or different data records concurrently. For example, some conflicting operations can lead to various anomalies, such as missing index record, or duplicated alternate keys, etc.

Many embodiments can be implemented to solve the issues identified here and achieve one or more of the following goals:

Scalability. As the number of shards increases, the system can provide near linearly increased throughput and each operation can maintain nearly constant latency.

Consistency. The system can be able to provide linearizability among concurrent operations and uniqueness guarantee of alternate keys. It is an intolerable burden for applications to reason about these consistencies.

Performance and Availability. Many applications are read-dominant and update alternate keys much less frequently than other attributes of a data record. Those reads and writes are expecting to perform with minimum latency. Without sacrificing consistency, availability can be expected.

Applicable over Most Database Technologies. In some embodiments, the solution provided herein can work with most on-the-shelf relational or non-relational database systems (e.g., Oracle, MySQL, MariaDB/Galera, SQL Server, Cassandra, etc.) because all of them are widely used. In some embodiments, the server side does not always provide distributed transaction functionality, which most out-of-box database technologies do not provide, e.g., two-phase commit and multi-version concurrency control supports from the server side. In some embodiments, each server in both the index store and the data store can be assumed to support single logical (read-modify-update) row/record transactional write. As a non-limiting example, a data store support local optimistic locking meets this assumption. For clarification, the term optimistic locking (for writes) is used to describe a solution in the following, but other embodiments can use other methods. Each server in the data store can also be assumed to support single logical row/record transactional read, that is, no dirty and no stale read (a read will return last persisted logic row/record)

Transactional Integrity.
  Never-Missing. In some embodiments, at any time, for any data record persisted in data store, all of its derived index records can be never missed in the index store
  Uniqueness. In some embodiments, at any time, for any alternate key, one data record that has the alternate key can persist in data store
  No-Blacklist. In some embodiments, at any time, for any alternate key, if no data record that persists in data store has this alternate key, this alternate key can be used by any existing or new data records.

Transactional Consistency.
  Transactional Write. In some embodiments, the insert/update/delete of a data record (and its derived index records) can be ACID (atomic, isolated, consistent and durable).

Fault-Tolerant. In some embodiments, the aforementioned transactional integrity and consistency is maintained under all non-byzantine failures. In some embodiments, no state is persisted in the client side. So client side can be fault-tolerant. In some embodiments, no state is persisted out of database servers. So there can be no additional failure dependencies. In some embodiments, failures of some clients will not block remaining clients, i.e., it can be globally non-blocking In many embodiments, optimistic locking can be either global, with a globally unique optimistic lock, or local, with a locally unique optimistic lock:

Global Optimistic Lock Locking

In many embodiments, an exemplary system, called Unihorn, such as system 300 (FIG. 3) or system 400, can be configured to control concurrent data record CRUD operations in a distributed data store to achieve the transactional integrity and consistency by global optimistic locking.

In many embodiments, clients, such as clients 432, can be configured to implement at least one of the following exemplary APIs in Unihorn, described with their respective semantics as below.

| API Name | API Signature | Semantics |
| --- | --- | --- |
| Create | DataRecord Create(DataRecord) | Transactional insert of data record and its derived index records |
| Read | DataRecord read(AK) | Return a non-dirty data record by indirection<br>If the index store is not available, (1) an exception can be thrown out if the data store is not scannable; or (2) scan the data store if the data store is scannable.<br>If the data store is not available, an exception can be thrown out. |
| Update | DataRecord Update(DataRecord) | Transactional update of data record and its derived index records |
| Delete | Boolean Delete(AK) | Transactional delete of data record and its derived index records |

In many embodiments, Unihorn can be configured to obey one or more of the following principles to achieve the aforementioned goals:

Sequencing data record operations involving index record changes. In order to control the concurrent CRUD operations across both the index store, such as index store 420, and the data store, such as data store 410, and each primary key can be associated with an optimistic lock opLock (pk, epoch, version), where epoch/generation can be an UUID (universal unique identifier) and version can be a long value. Each index record and/or each data record can be tagged with an optimistic lock. Each optimistic lock can be globally unique. All optimistic locks with the same epoch can form a dynasty (epoch, *). When a data record persists into the data store, a new dynasty can be created. Any update of the data record can increment its version (may not consecutively) while retaining its epoch, that is, the data record stays within the same dynasty. If a data record is deleted and its primary key is reused by another new data record, the new data record and/or all of its subsequent updates can stay in a different dynasty.

Optimistic locks associated with the same primary key can be partially ordered/comparable (not linearly ordered).

The optimistic lock of the data record currently in the data store (i.e., the optimistic lock of the largest version within current dynasty) can be the latest.

Optimistic locks within the same dynasty can be compared by their versions.

Optimistic locks associated with different primary keys can be incomparable with one exception: optimistic locks that are currently within any other dynasty are older than any optimistic lock in the current dynasty.

Persist its derived index records with the latest optimistic lock before persisting the data record. If a data record is persisted before persisting its derived index records, then there can exist a time gap where the index records are missing from the index store. Therefore, all of its derived index records can be persisted before persisting the data record.

1. The latest optimistic lock can be obtained before persisting all of its derived index records. In some embodiments, when no data record exists in the data store, such as data store 410, a new dynasty can be created (persisted in data store) with initial/latest optimistic lock (pk, UUID.randomUUID( ), null) and null attributes and alternate key, such a data record is called an empty data record. Its existence can be to acquire optimistic lock. In some embodiments, when the data record exists in the data store, such as data store 410, the latest optimistic lock can be the optimistic lock of the data record currently in the data store, such as data store 410.

2. All of its derived index records can be persisted and tagged with the obtained latest optimistic lock. For example, Unihorn can be configured to perform one or more of the following activities.

When such an index record does not exist, a new index record can be inserted into the index store, such as data store 410.

When such an index record exists, it can be in the same dynasty as the obtained latest optimistic lock, but can have a smaller version number, Unihorn can be configured to replace it.

When such an index record exists, it can be in the same dynasty as the obtained latest optimistic lock, but can have a bigger version number, Unihorn can then be configured to leave this index record intact and abort itself since other operations have inserted/updated this index record and may have persisted into the data store.

When such an index record exists with the exact same optimistic lock, the operation can proceed.

If such an index record exists, it can be in a different dynasty, then Unihorn can be configured to verify if it is in the current dynasty (the dynasty of the obtained latest optimistic lock may be past). If it is in the current dynasty, this operation can abort, otherwise, this index record can be deleted as garbage and retry persisting its derived index record.

Otherwise, such an index record can refer to a data record of a different primary key. If no persisted data record truly owns this index record, this index record can be deleted as garbage and retry persisting its derived index record. If a persisted data record truly owns this index record, this operation can abort.

Delete garbage index records after incrementing the latest optimistic lock. A garbage index record can be one that no persisted data record can derive it. Since a data record can persist after its derived index records persist, those derived index records can be successfully persisted yet the data record fails to persist, leading to possibly garbage index records eligible for cleaning up; on the other side, the data record can successfully persist as well, leading to valid index records. To clarify this ambiguity, Unihorn can be configured to precede any index record delete operation by incrementing the latest optimistic lock or creating an empty data record (in the data store) with initial optimistic lock (UUID-.randomUUID( ), 0) if non-exist. By doing so, ongoing operations attempting to persist into the data store can be destined to fail when the latest optimistic lock they use to tag their derived index records is older than the latest optimistic lock.

Persist data record only when no danger of missing any of its derived index records. From the moment that the derived index records of a data record persist into the index store to the moment that the data record persists, during this time window other operations on data records of the same primary key can delete some of those derived index records, leading to missing index records. Since any index record cleaning up (deleting) is preceded by incrementing the latest optimistic lock or creating an empty one if non-exist, no other concurrent operations can sneak in during that time window by verifying that the data record currently in the data store still has the same optimistic lock that was previously used to tag its derived index records. Further, Unihorn can be configured to increment the optimistic lock by 1 when persisting the data record to prevent the data record from being overwritten by older data records (leading to missing index records too).

Turning ahead in the drawings, FIGS. 5-8 show exemplary programs for APIs for a client, according to an embodiment. In many embodiments, the APIs can comprise methods for creating a data record, updating the data record (e.g., read( )), reading a data record based on an alternate key (e.g.), deleting an index record, adding a new data record and updating its derived index records (e.g., addAndUpdateindexRecords( )) and cleaning up a garbage index record (e.g., verifyOwnershipAndMaybeCleanup( )). The APIs shown in FIGS. 5-8 are merely exemplary and are not limited to the embodiments presented herein. The APIs can be employed in many different embodiments or examples not specifically depicted or described herein. In some embodiments, the procedures, the processes, and/or the activities of the APIs can be performed in the order presented. In other embodiments, the procedures, the processes, and/or the activities of the APIs can be performed in any suitable order. In still other embodiments, one or more of the procedures, the processes, and/or the activities of the APIs can be combined or skipped. In many embodiments, database management system 310 (FIG. 3) and/or client 432 (FIG. 4) can be suitable to perform the APIs and/or one or more of the activities of the APIs.

The following non-limiting example illustrates two threads T1 and T2 attempting to create two user accounts, Alice and Bob respectively, with the same alternate key news@yahoo.com. The rows from top to bottom show the steps in the order of time and their state in the data store and the index store after their executions. The two threads may intertwine in other ways.

| No. | Steps | data store (pk, ak, sequence, val) | index store (ak, pk, sequence) |
|---|---|---|---|
| 1 | T1: create optimistic lock (uuid1, 0) for Alice | (alice_userid, null, (uuid1, 0), null) | |
| 2 | T1: add index record of alternate key news@yahoo.com for Alice | (alice_userid, null, (uuid1, 0), null) | (news@yahoo.com, alice_userid, (uuid1, 0)) |
| 3 | T2: create optimistic lock (uuid2, 0) for Bob | (alice_userid, null, (uuid1, 0), null) (bob_userid, null, (uuid2, 0), null) | (news@yahoo.com, alice_userid, (uuid1, 0)) |
| 4 | T2: add index record of alternate key news@yahoo.com for Bob, fails due to uniqueness violation with (news@yahoo.com, alice_userid, (uuid1, 0)) | (alice_userid, null, (uuid1, 0), null) (bob_userid, null, (uuid2, 0), null) | (news@yahoo.com, alice_userid, (uuid1, 0)) |
| 5 | T2: increment Alice's optimistic lock, intending to delete (news@yahoo.com, alice_userid, (uuid1, 0)) | (alice_userid, null, (uuid1, 1), null) (bob_userid, null, (uuid2, 0), null) | (news@yahoo.com, alice_userid, (uuid1, 0)) |
| 6 | T2: delete the index record (news@yahoo.com, alice_userid, (uuid1, 0)) | (alice_userid, null, (uuid1, 1), null) (bob_userid, null, (uuid2, 0), null) | |
| 7 | T2: delete the empty data record of Alice after deleting the index record (news@yahoo.com, alice_userid, (uuid1, 0)) | (bob_userid, null, (uuid2, 0), null) | |
| 8 | T1: persist the data record for Alice, fails since Alice's empty data record was deleted by T2 | (bob_userid, null, (uuid2, 0), null) | |
| 9 | T2: add the same index record for Bob, succeeds | (bob_userid, null, (uuid2, 0), null) | (news@yahoo.com, bob_userid, (uuid2, 0)) |
| 10 | T2: persist the data record for Bob and increment its optimistic lock, succeeded | (bob_userid, news@yahoo.com, (uuid2, 1), val) | (news@yahoo.com, bob_userid, (uuid2, 0)) |

Figure 9:
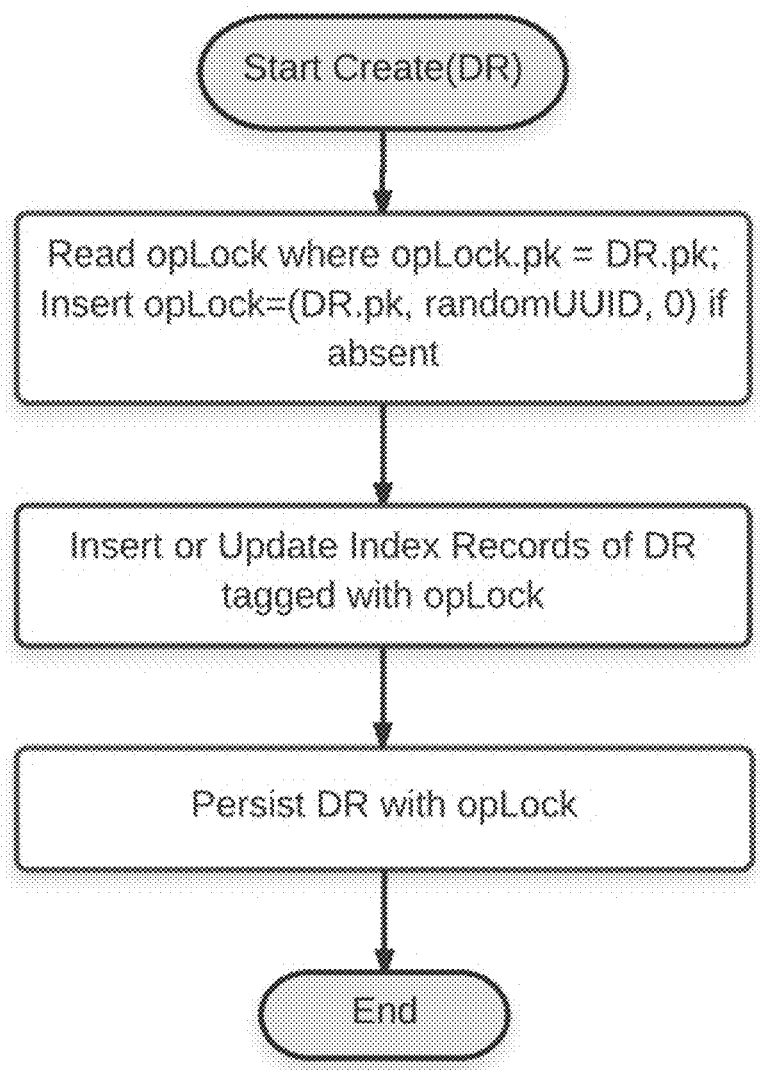
FIG. 9 illustrates a method for creating a data record in a sharded database, according to an embodiment.

Turning ahead in the drawings, FIG. 9 illustrates a flow chart for a method 900, according to an embodiment. In many embodiments, method 900 can be a method for creating a data record. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In still other embodiments, one or more of the procedures, the processes, and/or the activities of method 900 can be combined or skipped.

In many embodiments, database management system 310 (FIG. 3) and/or client 432 (FIG. 4) can be suitable to perform method 900 and/or one or more of the activities of method 900. In these or other embodiments, one or more of the activities of method 900 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 900 can be illustrated using diagrams following the aforementioned algorithmic description with notations.

Green Boxes: Access Data Store
Blue Boxes: Access Index Store
Black Boxes: Local Operations
Dashed Boxes: Call Another Routine In many embodiments, method 900 can comprise one or more of the following steps or activities:
1. Read the latest optimistic lock opLock associated with DR's primary key from the data store. If absent, initialize opLock=(DR.pk, randomUUID, 0) and insert it into the data store.
2. For each of DR's alternate keys ak: insert a new index record or update the existing index record for ak of DR, tagged with opLock.
3. Persist DR and increment its version number into the data store as long as it still holds the opLock, that is, no other concurrent operations (attempting to delete index records) have ever sneaked from step #1. Note that if the version number of the opLock is null, the version number will be incremented to 0.

Figure 10:
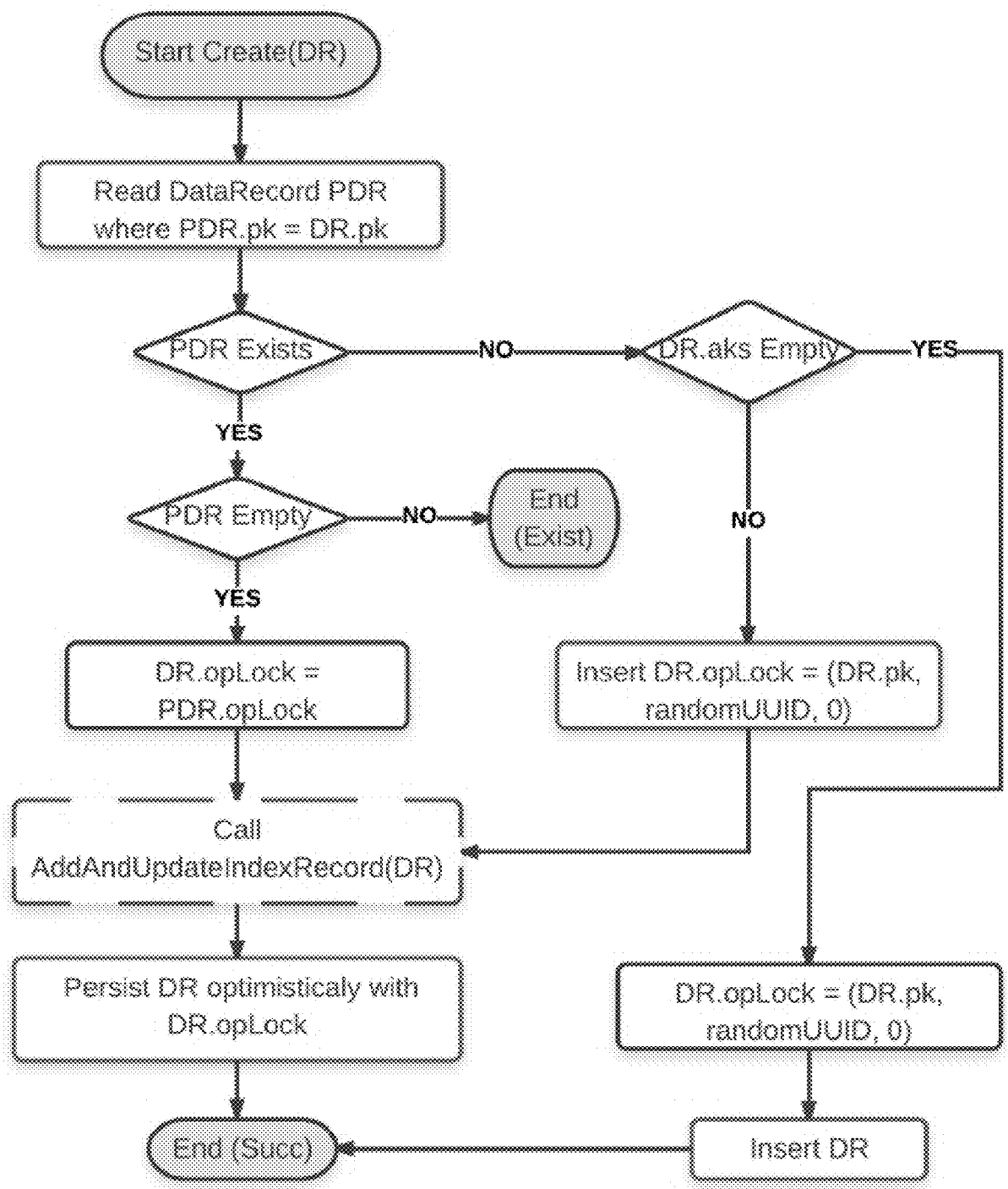
FIG. 10 illustrates a method for creating a data record in a sharded database, according to another embodiment.

Turning ahead in the drawings, FIG. 10 illustrates a flow chart for a method 1000, according to another embodiment. In many embodiments, method 1000 can be a method for creating a data record. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In still other embodiments, one or more of the procedures, the processes, and/or the activities of method 1000 can be combined or skipped.

In many embodiments, database management system 310 (FIG. 3) and/or client 432 (FIG. 4) can be suitable to perform method 1000 and/or one or more of the activities of method 1000. In these or other embodiments, one or more of the activities of method 1000 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1000 can comprise one or more of the following steps or activities:
1. Read the latest optimistic lock opLock associated with DR's primary key from the data store. If absent, initialize opLock=(DR.pk, randomUUID, 0) and insert it into the data store.
2. For each of DR's alternate keys ak:
   a. if absent in the index store, insert index record (ak, DR.primaryKey, DR.epoch, DR.version) into the index store;
   b. if there exists a persisted index record PIR in the index record where PIR.alternateKey=ak and PIR.primaryKey=DR.primaryKey,
      i. if PIR.epoch=DR.epoch and PIR.version<DR.version, update PIR with PIR.version=DR.version
      ii. if PIR.epoch belongs to a past dynasty and DR.epoch belongs to current epoch, update PIR with PIR.epoch=DR.epoch and PIR.version=DR.version
      iii. if both PIR.epoch and DR.epoch belongs to a past dynasty, this creation operation aborts itself.
      iv. otherwise, do nothing and proceeds to step #3.
   c. if there exists a persisted index record PIR in the index record where PIR.alternateKey=ak and PIR.primaryKey !=DR.primaryKey, verify whether PIR is garbaged or valid:
      i. if PIR is garbaged (i.e., disowned or orphaned), replace PIR with index record (ak, DR.primaryKey, DR.epoch, DR.version) into the index store.
      ii. If PIR is valid, this creation operation aborts itself.
3. Persist DR and increment its version number into the data store as long as it still holds the opLock, that is, no other concurrent operations (attempting to delete index records) have ever sneaked from step #1. Note that if the version number of the opLock is null, the version number will be incremented to 0.

Note that if the data record to create does not have any alternate key, the data record can be directly inserted into the data store if no data record of the same primary key exists, or update the data record and increment the version number of the opLock if an empty data record of the same primary key exists. An empty data record can be a data record that only has the primary key and opLock attributes and has empty value/payload. Essentially, an empty data record can serve as a global optimistic lock.

Figure 11:
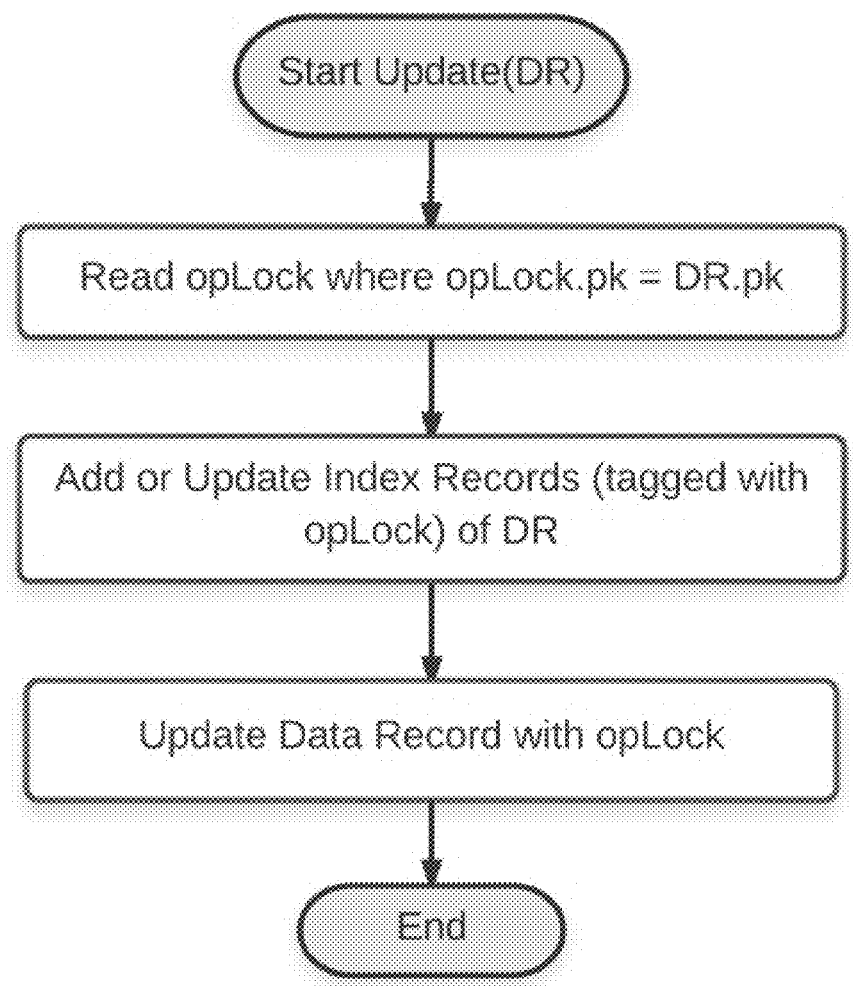
FIG. 11 illustrates a method for updating a data record in a sharded database, according to an embodiment.

Turning ahead in the drawings, FIG. 11 illustrates a flow chart for a method 1100, according to another embodiment. In many embodiments, method 1100 can be a method for updating a data record. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. In still other embodiments, one or more of the procedures, the processes, and/or the activities of method 1100 can be combined or skipped.

In many embodiments, database management system 310 (FIG. 3) and/or client 432 (FIG. 4) can be suitable to perform method 1100 and/or one or more of the activities of method 1100. In these or other embodiments, one or more of the activities of method 1100 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1100 can comprise the steps or activities almost the same as those of method 900, except that if no non-empty data record of the same primary key and of the same opLock exists in the data store, the update record can abort.

Figure 12:
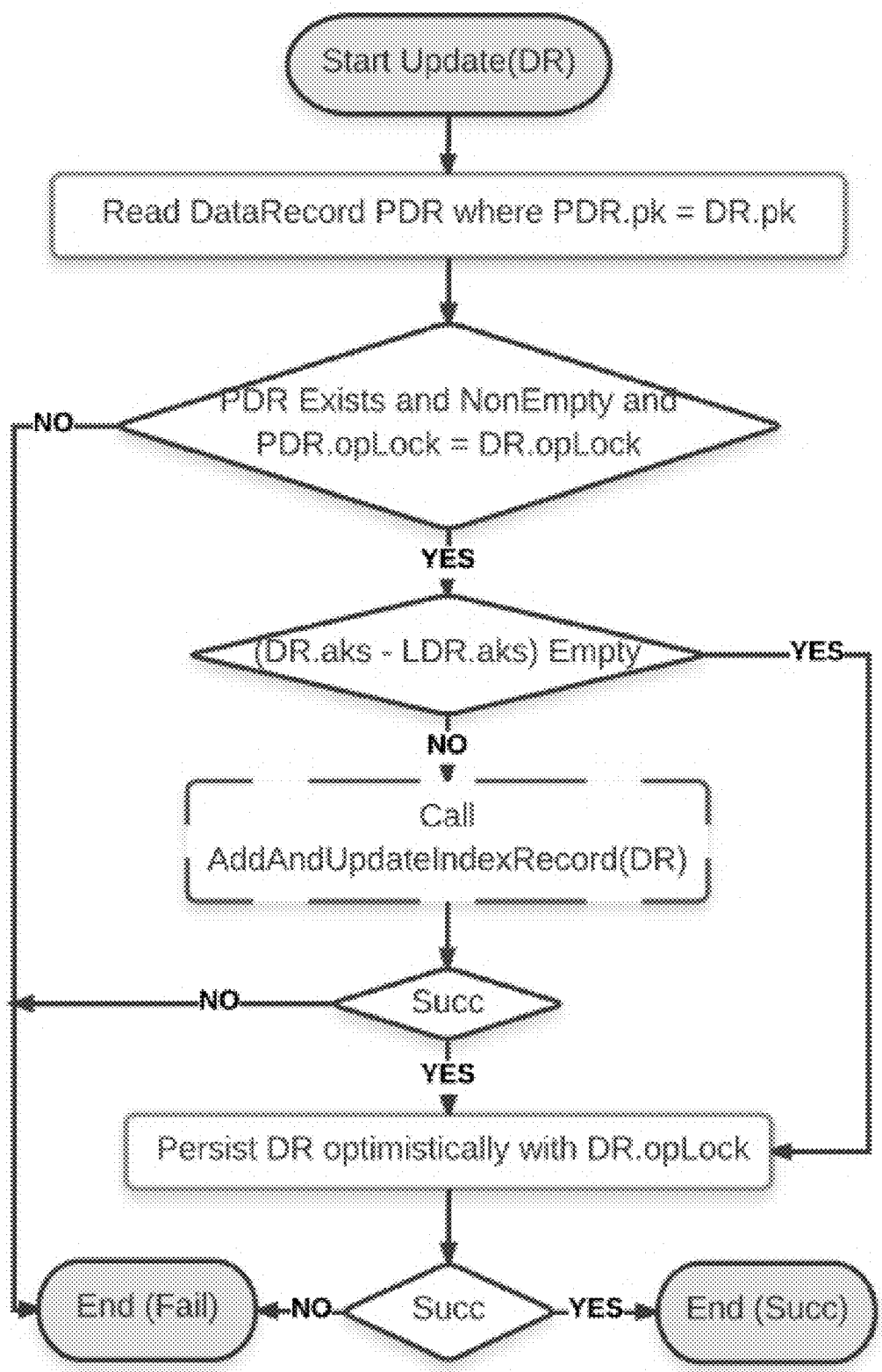
FIG. 12 illustrates a method for updating a data record in a sharded database, according to another embodiment.

Turning ahead in the drawings, FIG. 12 illustrates a flow chart for a method 1200, according to another embodiment. In many embodiments, method 1200 can be a method for updating a data record. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped. In still other embodiments, one or more of the procedures, the processes, and/or the activities of method 1200 can be combined or skipped.

In many embodiments, database management system 310 (FIG. 3) and/or client 432 (FIG. 4) can be suitable to perform method 1200 and/or one or more of the activities of method 1200. In these or other embodiments, one or more of the activities of method 1200 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1200 can comprise the steps or activities almost the same as those of method 1000, except that if no non-empty data record of the same primary key and of the same opLock exists in the data store, the update record can abort.

Figure 13:
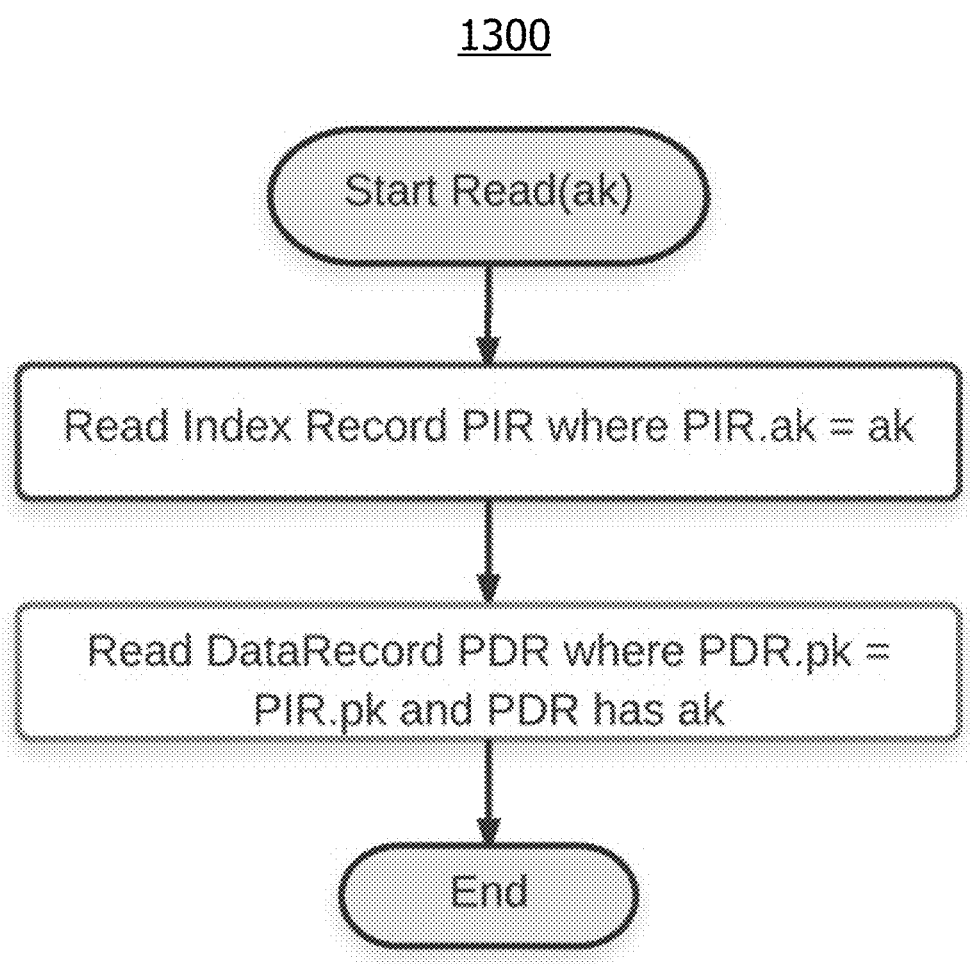
FIG. 13 illustrates a method for reading a data record in a sharded database, according to an embodiment.

Turning ahead in the drawings, FIG. 13 illustrates a flow chart for a method 1300, according to another embodiment. In many embodiments, method 1300 can be a method for reading a data record based on an alternate key. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped. In still other embodiments, one or more of the procedures, the processes, and/or the activities of method 1300 can be combined or skipped.

In many embodiments, database management system 310 (FIG. 3) and/or client 432 (FIG. 4) can be suitable to perform method 1300 and/or one or more of the activities of method 1300. In these or other embodiments, one or more of the activities of method 1300 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1300 can comprise the following steps or activities:
1. Read from the index store the index record whose identifier is ak, return null if ab sent
2. Read from the data store the data record whose identifier is pk of the index record. If the data record has the ak, return the data record, otherwise return null.

Figure 14:
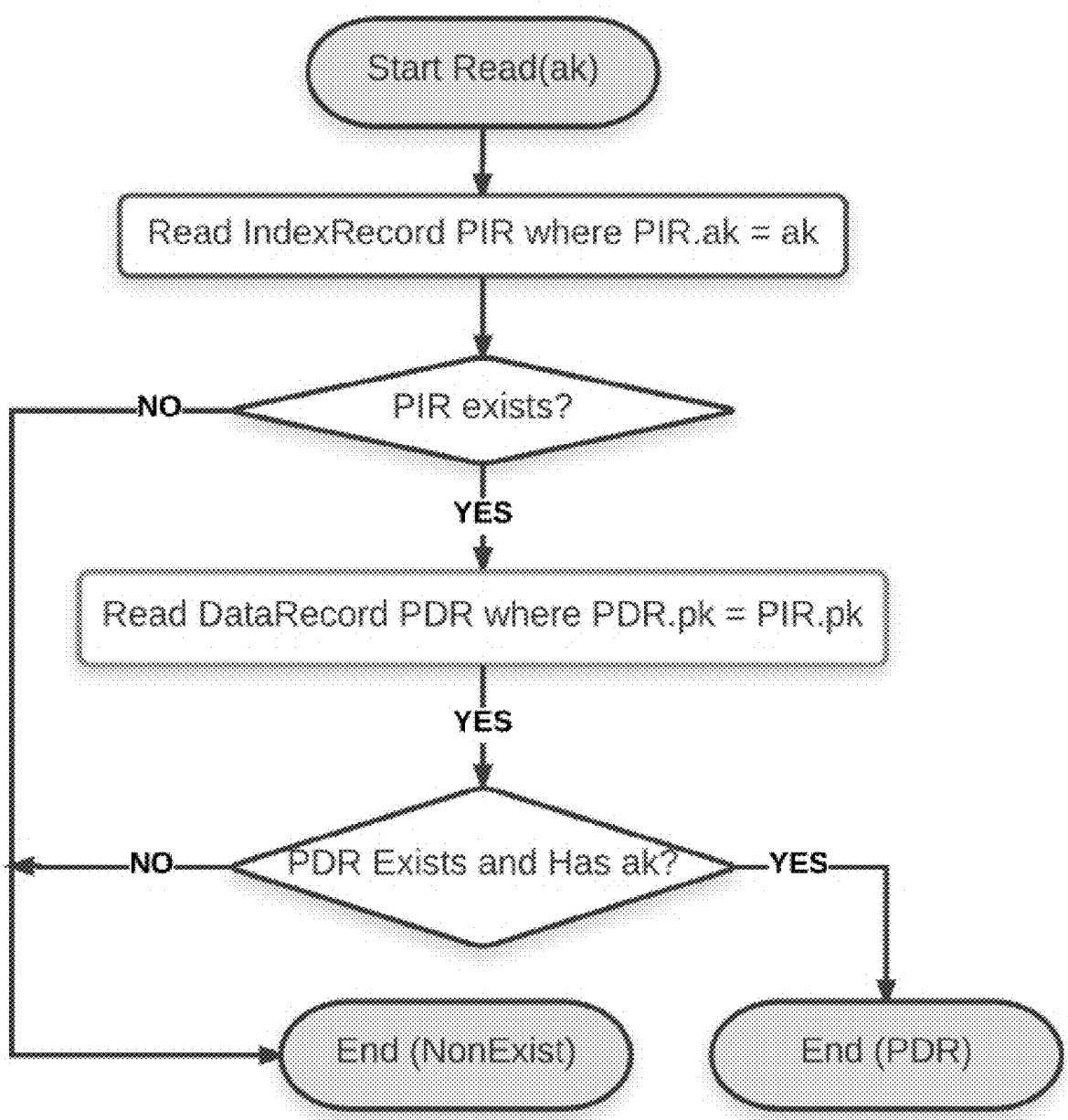
FIG. 14 illustrates a method for reading a data record in a sharded database, according to another embodiment.

Turning ahead in the drawings, FIG. 14 illustrates a flow chart for a method 1400, according to another embodiment. In many embodiments, method 1400 can be a method for reading a data record based on an alternate key. Method 1400 is merely exemplary and is not limited to the embodiments presented herein. Method 1400 can be employed in many different embodiments or examples not specifically depicted or described herein. In some embodiments, the procedures, the processes, and/or the activities of method 1400 can be performed in the order presented. In other embodiments, the procedures, the processes, and/or the activities of method 1400 can be performed in any suitable order. In still other embodiments, one or more of the procedures, the processes, and/or the activities of method 1400 can be combined or skipped. In still other embodiments, one or more of the procedures, the processes, and/or the activities of method 1400 can be combined or skipped.

In many embodiments, database management system 310 (FIG. 3) and/or client 432 (FIG. 4) can be suitable to perform method 1400 and/or one or more of the activities of method 1400. In these or other embodiments, one or more of the activities of method 1400 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1400 can comprise steps or activities similar to method 1300, with additional failproof mechanisms.

Figure 15:
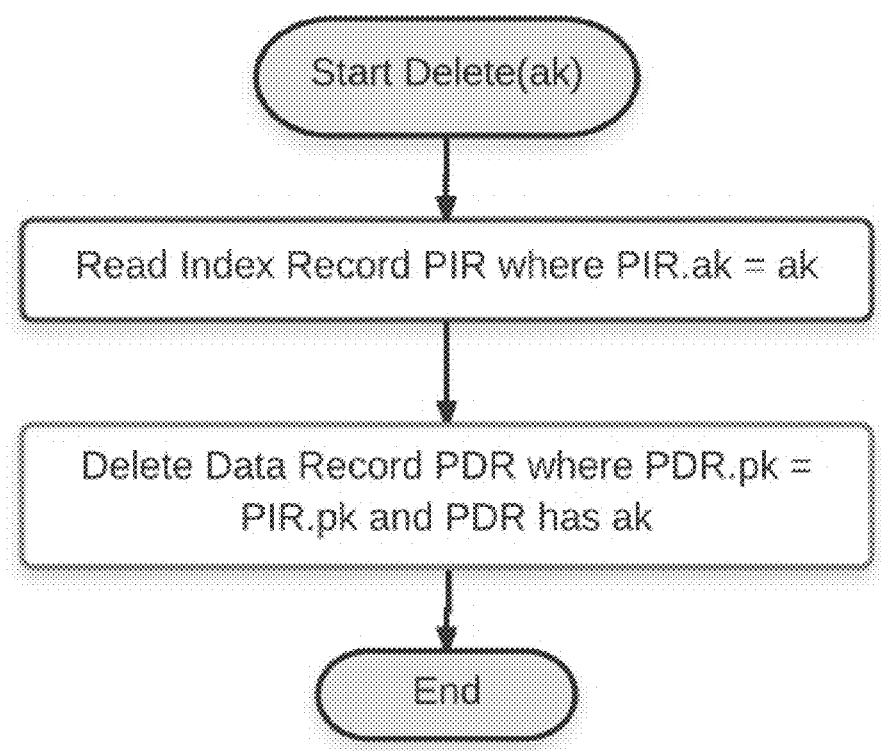
FIG. 15 illustrates a method for deleting a data record in a sharded database, according to an embodiment.

Turning ahead in the drawings, FIG. 15 illustrates a flow chart for a method 1500, according to another embodiment. In many embodiments, method 1500 can be a method for deleting a data record based on an alternate key. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of method 1500 can be performed in any suitable order. In still other embodiments, one or more of the procedures, the processes, and/or the activities of method 1500 can be combined or skipped. In still other embodiments, one or more of the procedures, the processes, and/or the activities of method 1500 can be combined or skipped.

In many embodiments, database management system 310 (FIG. 3) and/or client 432 (FIG. 4) can be suitable to perform method 1500 and/or one or more of the activities of method 1500. In these or other embodiments, one or more of the activities of method 1500 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1500 can comprise the following steps or activities:
1. Read from the index store the index record whose identifier is ak, return null if absent
2. Delete from the data store the data record if it has the ak.

Figure 16:
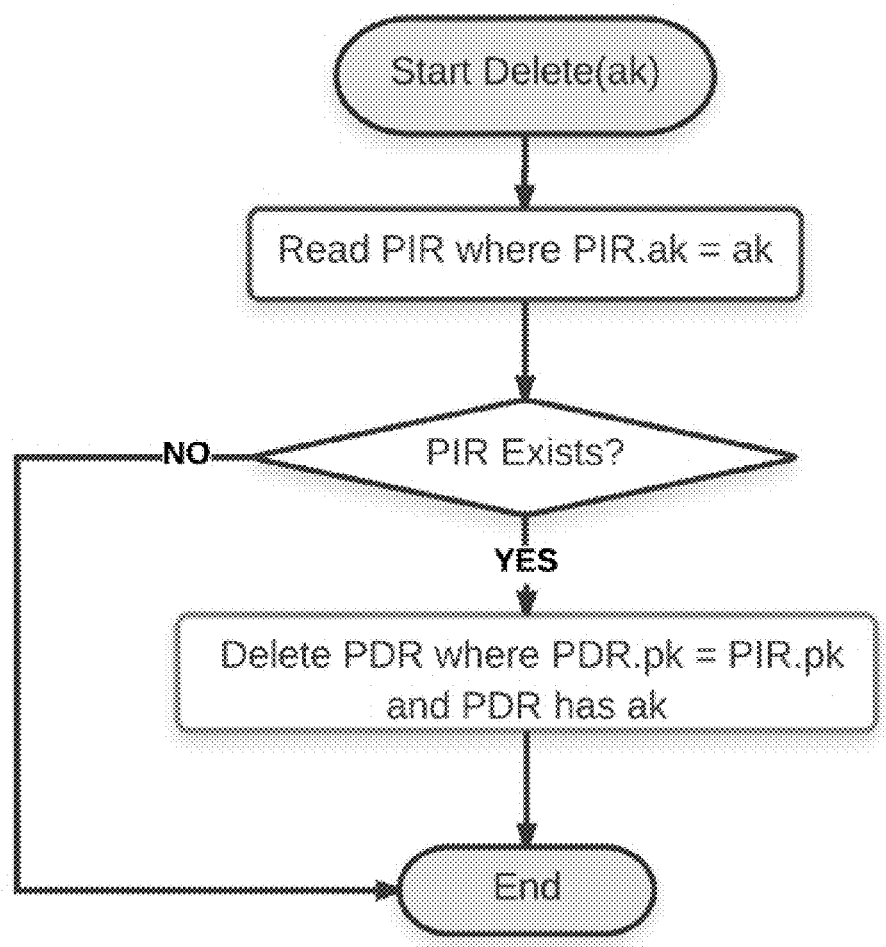
FIG. 16 illustrates a method for deleting a data record in a sharded database, according to another embodiment.

Turning ahead in the drawings, FIG. 16 illustrates a flow chart for a method 1600, according to another embodiment. In many embodiments, method 1600 can be a method for deleting a data record based on an alternate key. Method 1600 is merely exemplary and is not limited to the embodiments presented herein. Method 1600 can be employed in many different embodiments or examples not specifically depicted or described herein. In some embodiments, the procedures, the processes, and/or the activities of method 1600 can be performed in the order presented. In other embodiments, the procedures, the processes, and/or the activities of method 1600 can be performed in any suitable order. In still other embodiments, one or more of the procedures, the processes, and/or the activities of method 1600 can be combined or skipped. In still other embodiments, one or more of the procedures, the processes, and/or the activities of method 1600 can be combined or skipped.

In many embodiments, database management system 310 (FIG. 3) and/or client 432 (FIG. 4) can be suitable to perform method 1600 and/or one or more of the activities of method 1600. In these or other embodiments, one or more of the activities of method 1600 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1600 can comprise the following steps or activities:
1. Read from the index store the index record whose identifier is ak, return null if absent.
2. If no data record referred by the index record exists in the data store, return null.
3. Delete from the data store the data record if it has the ak.

Figure 17:
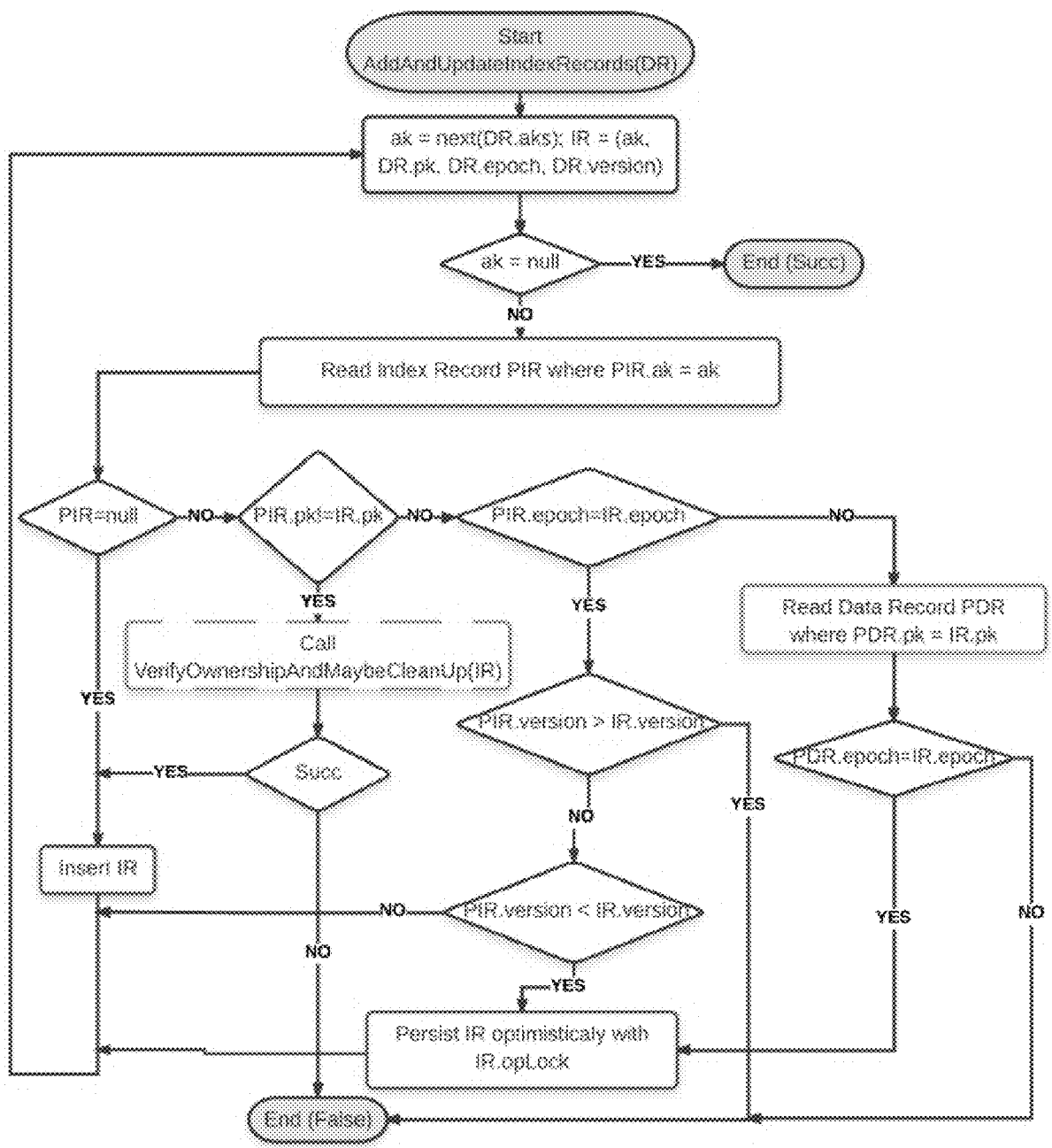
FIG. 17 illustrates a method for adding or updating index records in an index store referred by a data record, according to an embodiment.

Turning ahead in the drawings, FIG. 17 illustrates a flow chart for a method 1700, according to another embodiment. In many embodiments, method 1700 can be a method for adding and/or updating one or more index records for alternate keys derived from a data record. Method 1700 is merely exemplary and is not limited to the embodiments presented herein. Method 1700 can be employed in many different embodiments or examples not specifically depicted or described herein. In some embodiments, the procedures, the processes, and/or the activities of method 1700 can be performed in the order presented. In other embodiments, the procedures, the processes, and/or the activities of method 1700 can be performed in any suitable order. In still other embodiments, one or more of the procedures, the processes, and/or the activities of method 1700 can be combined or skipped. In still other embodiments, one or more of the procedures, the processes, and/or the activities of method 1700 can be combined or skipped.

In many embodiments, database management system 310 (FIG. 3) and/or client 432 (FIG. 4) can be suitable to perform method 1700 and/or one or more of the activities of method 1700. In these or other embodiments, one or more of the activities of method 1700 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1700 can comprise the following steps or activities:
1. Insert index records if absent
2. Update the tagged opLock of an index record if it is stale than the opLock of the data record.
3. Delete garbaged index records if they have the same alternate key as an index record of the data record, and insert the index record of the data record.
4. If an index record has the same alternate key as an index record of the data record and it is NOT garbaged, then this operation can abort (so no two index records of the same alternate key are persisted in the index store)
5. Determine if an existing index record is garbaged or not should be cautious, an existing index record may belong to past dynasty, to an past operation of current dynasty, to an ongoing operation of the current dynasty, and to a different primary key, etc.

Figure 18:
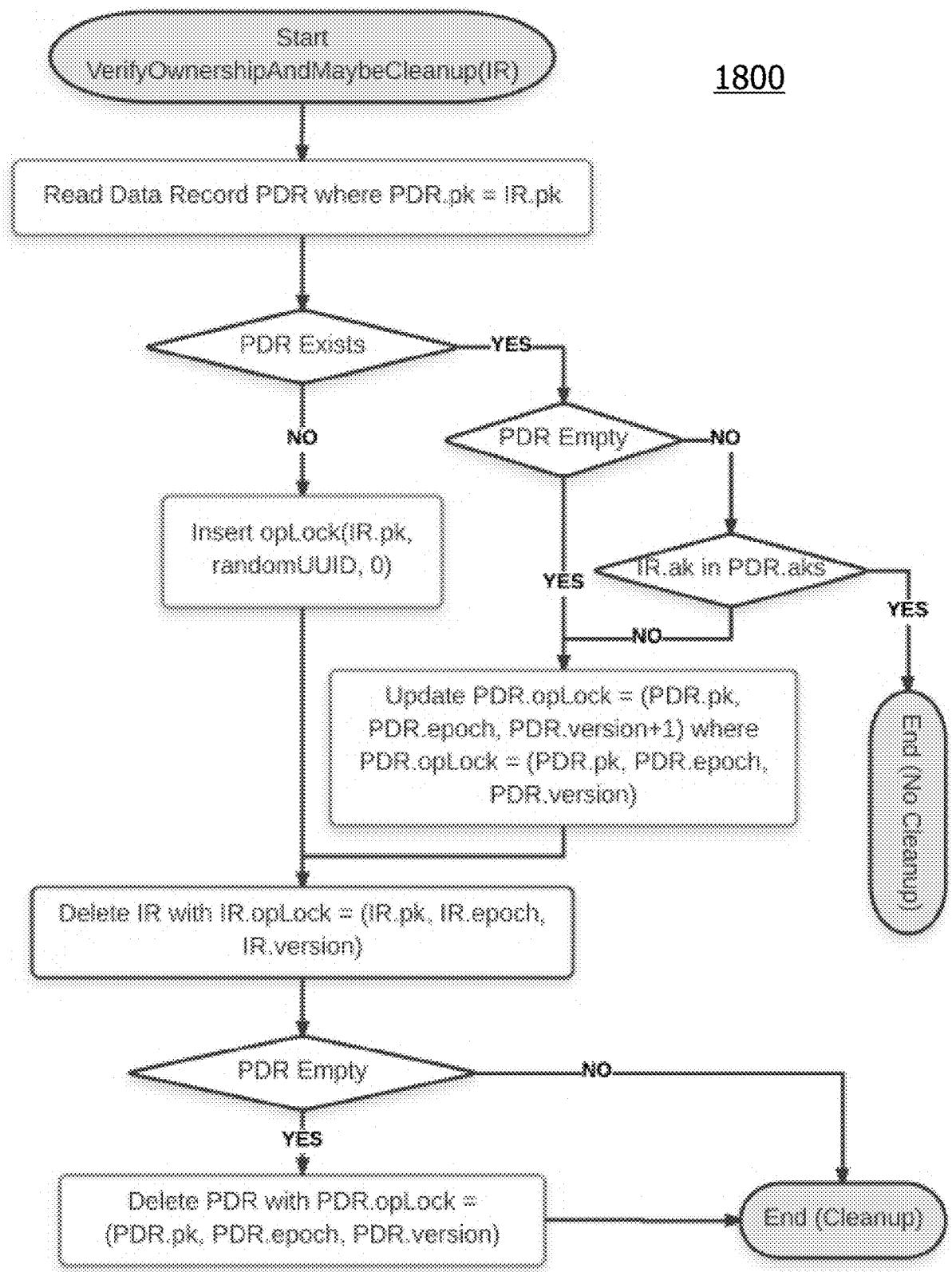
FIG. 18 illustrates a method for cleaning up a garbage index records in an index store, according to another embodiment.

Turning ahead in the drawings, FIG. 18 illustrates a flow chart for a method 1800, according to another embodiment. In many embodiments, method 1800 can be a method for adding and/or updating one or more index records for alternate keys derived from a data record. Method 1800 is merely exemplary and is not limited to the embodiments presented herein. Method 1800 can be employed in many different embodiments or examples not specifically depicted or described herein. In some embodiments, the procedures, the processes, and/or the activities of method 1800 can be performed in the order presented. In other embodiments, the procedures, the processes, and/or the activities of method 1800 can be performed in any suitable order. In still other embodiments, one or more of the procedures, the processes, and/or the activities of method 1800 can be combined or skipped. In still other embodiments, one or more of the procedures, the processes, and/or the activities of method 1800 can be combined or skipped.

In many embodiments, database management system 310 (FIG. 3) and/or client 432 (FIG. 4) can be suitable to perform method 1800 and/or one or more of the activities of method 1800. In these or other embodiments, one or more of the activities of method 1800 can be implemented as one or more computing instructions configured to run at one or more processors and configured to be stored at one or more non-transitory computer readable media. Such non-transitory computer readable media can be part of a computer system such as database management system 310 (FIG. 3) and/or client 432 (FIG. 4). The processor(s) can be similar or identical to the processor(s) described above with respect to computer system 100 (FIG. 1).

In many embodiments, method 1800 can comprise the following steps or activities:

1. Read the data record referred by the index record to verify an index record is garbaged or truly owned by a persisted data record. If truly owned, no cleanup is needed, otherwise proceeds to next step
2. Acquiring the global optimistic lock first (create one if absent)
3. Delete the index record optimistically
4. If the data record is empty, delete the data record while still holding its global optimistic lock In many embodiments, Unihorn can be configured to handle the following exemplary racing conditions.

Non-Limiting Example 1: Concurrent Update Operations to the Same Alternate Key T1 and T2 attempt to change their respective alternate keys for Alice and Bob respectively to a common alternate key news@yahoo.com, only one of T1 and T2 will succeed.

| No. | Steps | Data Store (pk, ak, sequence, val) | Index Store (ak, pk, sequence) |
|---|---|---|---|
| 1 | Initial | (alice_userid, alice@yahoo.com, (uuid1, 1), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) |
| 2 | T1: read the latest data record of Bob, realizing the update operation for Bob involves index record changes T2: read the latest data record of Alice, realizing the update operation for Alice involves index record changes | (alice_userid, alice@yahoo.com, (uuid1, 1), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) |
| 3 | T1: add index record of news@yahoo.com for Alice with the latest optimistic lock (uuid1,1) from the latest data record of Alice, succeeds | (alice_userid, alice@yahoo.com, (uuid1, 1), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) (news@yahoo.com, alice_userid, (uuid1, 1)) |
| 4 | T2: add index record of news@yahoo.com for Bob with the latest optimistic lock (uuid2, 1) from the latest data record of Bob, fails due to uniqueness violation with (news@yahoo.com, alice_userid, (uuid1, 1)) | (alice_userid, alice@yahoo.com, (uuid1, 1), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) (news@yahoo.com, alice_userid, (uuid1, 1)) |
| 5 | T2: increment Alice's optimistic lock, intending to delete (news@yahoo.com, alice_userid, (uuid1, 1)) | (alice_userid, alice@yahoo.com, (uuid1, 2), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) (news@yahoo.com, alice_userid, (uuid1, 1)) |
| 6 | T1: persist data record for Alice, fails since its optimistic lock was incremented (optimistic lock exception) by T2 | (alice_userid, alice@yahoo.com, (uuid1, 2), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) (news@yahoo.com, alice_userid, (uuid1, 1)) |

| No. | Steps | Data Store (pk, ak, sequence, val) | Index Store (ak, pk, sequence) |
|---|---|---|---|
| 7 | T2: delete index record of news@yahoo.com for Alice | (alice_userid, alice@yahoo.com, (uuid1, 2), alice_val) (bob_userid, bob@yahoo.com, (uuid2, 1), bob_val) | (alice@yahoo.com, alice_userid, (uuid1, 0)) (bob@yahoo.com, bob_userid, (uuid2, 0)) |
| 8 | T2: retry adding index record of news@yahoo.com for Bob with the latest optimistic lock (uuid2, 1) from the latest data record of Bob, succeeds | (alice_userid, alice@yahoo.com, (uuid1, 2), alice_val) (bob_userid, bob@yahoo.com, (uuid2, 0)) | (alice@yahoo.com, alice_userid, (uuid1, 0)) (bob_userid, bob@yahoo.com, (uuid2, 1), bob_val) (news@yahoo.com, bob_userid, (uuid2, 1)) |
| 9 | T2: persist the data record for Bob and increment its optimistic lock, succeeds. (note that index record (bob@yahoo.com, bob_userid, (uuid2, 0)) is garbaged but not clean up yet) | (alice_userid, alice@yahoo.com, (uuid1, 2), alice_val) (bob_userid, bob@yahoo.com, (uuid2, 2), bob_val) | (alice@yahoo.com, alice_userid, (uuid1, 0)) (bob@yahoo.com, bob_userid, (uuid2, 0)) (news@yahoo.com, bob_userid, (uuid2, 1)) |

Non-Limiting Example 2: Concurrent Delete and Insert Operations on the Exact Same Data Record T1 has deleted a data record from the data store without deleting its derived index records while T2 attempts to re-incarnate the exact data record with the same alternate keys; T2 succeed.

| No. | Steps | Data Store (pk, ak, sequence, val) | Index Store (ak, pk, sequence) |
|---|---|---|---|
| 1 | Initial | (alice_userid, alice@yahoo.com, (uuid1, 1), val) | (alice@yahoo.com, alice_userid, (uuid1, 0)) |
| 2 | T1: delete data record of Alice without deleting its derived index records | | (alice@yahoo.com, alice_userid, (uuid1, 0)) |
| 3 | T2: find no data record of primary key_alice_userid, insert an empty data recorded with optimistic lock (uuid2, 0) into data store | (alice_userid, null, (uuid2, 0), null) | (alice@yahoo.com, alice_userid, (uuid1, 0)) |
| 4 | T2: find garbaged (alice@yahoo.com, alice_userid, (uuid1, 0)) from past dynasty (uuid1, *), replace it with (alice@yahoo.com, alice_userid, (uuid2, 0)) | (alice_userid, null, (uuid2, 0), null) | (alice@yahoo.com, alice_userid, (uuid2, 0)) |
| 5 | T2: persist the data record for Alice and increment its optimistic lock, succeeds | (alice_userid, alice@yahoo.com, (uuid2, 1), val) | (alice@yahoo.com, alice_userid, (uuid2, 0)) |

Non-Limiting Example 3: Retried Insert Operations of the Same Data Record with the Same Alternate Keys in a Quick Succession T1 tries to insert a data record, it sleeps after adding its derived index records; T2 retries the same insert operation and succeeds; T1 wakes up to resume its insert operation and fails.

| No. | Steps | Data Store (pk, ak, sequence, val) | Index Store (ak, pk, sequence) |
|---|---|---|---|
| 1 | T1: create an empty data record with optimistic lock (uuid1, 0) for Alice, intending to create a new data record for Alice | (alice_userid, null, (uuid1, 0), null) | |
| 2 | T1: add index record for Alice | (alice_userid, null, (uuid1, 0), null) | (alice@yahoo.com, alice_userid, (uuid1, 0)) |
| 3 | T2: find a data record (even though empty) for Alice, find the up-to-date index record for Alice, therefore no write to either data store or index store | (alice_userid, null, (uuid1, 0), null) | (alice@yahoo.com, alice_userid, (uuid1, 0)) |
| 4 | T2: persist the data record for Alice and increment its optimistic lock, succeeds | (alice_userid, alice@yahoo com, (uuid1, 1), val) | (alice@yahoo.com, alice_userid, (uuid1, 0)) |
| 5 | T1: wake up and persist the data record for Alice and increment its optimistic lock, fails due to the loss of its optimistic lock (uuid1, 0) that taken over by T2 | (alice_userid, alice@yahoo.com, (uuid1, 1), val) | (alice@yahoo.com, alice_userid, (uuid1, 0)) |

Non-Limiting Example 4: Clean Up Garbaged Index Record when Inserting a New Data Record the data record for Alice has been deleted without deleting its derived index records of alternate key news@yahoo.com; T1 tries to insert a data record with alternate key news@yahoo.com for Bob.

| No. | Steps | Data Store (pk, ak, sequence, val) | Index Store (ak, pk, sequence) |
|---|---|---|---|
| 1 | Initial: a garbaged index record | | (news@yahoo.com, alice_userid, (uuid1, 0)) |
| 2 | T1: create an empty data record with optimistic lock (uuid2, 0) for Bob | (bob_userid, null, (uuid2, 0), null) | (news@yahoo.com, alice_userid, (uuid1, 0)) |
| 3 | T1: add index record of alternate key news@yahoo.com for Bob, fails since an index record (news@yahoo.com, alice_userid, (uuid1, 0)) exists | (bob_userid, null, (uuid2, 0), null) | (news@yahoo.com, alice_userid, (uuid1, 0)) |
| 4 | T1: find no data record exists for Alice, create an empty data record (alice_userid, null, (uuid3, 0), null) for Alice (preparing to clean up the garbaged record). | (bob_userid, null, (uuid2, 0), null), (alice_userid, null, (uuid3, 0), null) | (news@yahoo.com, alice_userid, (uuid1, 0)) |
| 5 | T1: delete the garbaged record | (bob_userid, null, (uuid2, 0), null), (alice_userid, null, (uuid3, 0), null) | |
| 6 | T1: delete the empty data record that just created for garbage cleanup | (bob_userid, null, (uuid2, 0), null) | |
| 7 | T1: add index record for Bob | (bob_userid, null, (uuid2, 0), null) | (news@yahoo.com, bob_userid, (uuid2, 0)) |
| 8 | T1: persist the data record for Bob and increment its optimistic lock, succeeds | (bob_userid, news@yahoo.com, (uuid2, 1), val) | (news@yahoo.com, bob_userid, (uuid2, 0)) |

Non-Limiting Example 5: Update a Data Record without Alternate Key Changes

T1 tries to update the value for Alice from val1 to val2 without changing alternate keys.

| No. | Steps | Data Store (pk, ak, sequence, vat) | Index Store (ak, pk, sequence) |
|---|---|---|---|
| 1 | Initial: | (alice_userid, alice@yahoo.com, (uuid1, 0), val1) | (alice@yahoo.com, alice_userid, (uuid1, 0)) |
| 2 | T1: found no alternate key changes by comparing the to-be-updated data record and the existing data record in the data store for Alice | (alice_userid, alice@yahoo.com, (uuid1, 0), val1) | (alice@yahoo.com, alice_userid, (uuid1, 0)) |
| 3 | T1: directly update the data record and increment its optimistic lock in the data store, no need to access the index store | (alice_userid, alice@yahoo.com, (uuid1, 1), val2) | (alice@yahoo.com, alice_userid, (uuid1, 0)) |

Non-Limiting Example 6: Concurrent Update and Delete Operations on the Same Data Record T1 tries to update the alternate key for Alice to news@yahoo.com; T2 tries to delete this data record for Alice.

| No. | Steps | Data Store (pk, ak, sequence, val) | Index Store (ak, pk, sequence) |
|---|---|---|---|
| 1 | Initial: | (alice_userid, alice@yahoo.com, (uuid1, 1), val1) | (alice@yahoo.com, alice_userid, (uuid1, 0)) |
| 2 | T1: read the latest data record of Alice, realizing the update operation for Alice involves index record changes | (alice_userid, alice@yahoo.com, (uuid1, 1), val1) | (alice@yahoo.com, alice_userid, (uuid1, 0)) |
| 3 | T1: add index record of alternate key news@yahoo.com for Alice | (alice_userid, alice@yahoo.com, (uuid1, 1), val1) | (alice@yahoo.com, alice_userid, (uuid1, 0)), (news@yahoo.com, alice_userid, (uuid1, 1)) |
| 4 | T2: delete the data record for Alice (without deleting its derived index records), succeeds | | (alice@yahoo.com, alice_userid, (uuid1, 0)), (news@yahoo.com, alice_userid, (uuid1, 1)) |
| 5 | T1: persist the data record for Alice, fails since the data record (including its optimistic lock) was deleted by T2 (however two garbaged index records are left) | | (alice@yahoo.com, alice_userid, (uuid1, 0)), (news@yahoo.com, alice_userid, (uuid1, 1)) |

Local Optimistic Locking

In many embodiments, an exemplary system, called Uniqorn, such as system 300 (FIG. 3) or system 400, can be configured to control concurrent data record CRUD operations in a distributed data store to achieve the transactional integrity and consistency by local optimistic locking with client-managed indexes.

In some embodiments with local optimistic locking, where every data record has a unique alternate key, Uniqorn can comprise a data store, such as data store 410 (FIG. 4), an index store, such as index store 420 (FIG. 4), and one or more client systems, such as client system 430. In other similar embodiments, Uniqorn can comprise a data store, such as data store 410 (FIG. 4), an index store, such as index store 420 (FIG. 4), and one or more clients, such as client 432.

In many embodiments, the data store and index store of Uniqorn can be configured to support linearization of single-record read/write operations and conditional write operations. For example, in many embodiments, the underlying storage engine of the data store and/or index store can be configured to provide the primitives or equivalents as below.

| Primitive | Semantic |
|---|---|
| get (key) | return the latest record of key |
| insert (record) | return true if no record of key exists and record is inserted |
| delete (key) | return true if no record of key exists or the record of key is deleted |
| condUpdate (record, cond) | return true if a record that has the same key as record and has the same value ascend on an agreed column exists, and is updated to record |

| Primitive | Semantic |
|---|---|
| condDelete (record, cond) | return true if no record that has the same key as record exists, or the record that has the same key as record and has the same value as cond on an agreed column exists and is deleted |

Many relational databases (e.g., Oracle, MySQL, and PostgreSQL) and key-value/document stores (e.g., SimpleDB, and Couchbase) provide these or similar primitives. Due to the conditional write primitives (e.g., insert/condUpdate/condDelete), a client using these or similar primitives can guard against lost update.

In many embodiments, each client, such as client 432 (FIG. 4), can be configured to provide a physical or logical clock which ticks forward, even across restarts. Nonetheless, the clocks are not required to synchronize to the real time and to one another. In many embodiments, each client, such as client 432 (FIG. 4), can have a globally unique identification (e.g., the identity of the machine where a client runs).

| Primitive | Semantic |
|---|---|
| nextTS ( ) | return the next timestamp that is greater than any returned timestamps at the calling client |
| clientID ( ) | return the globally unique identification of the calling client |

In many embodiment, the data records in the data store, such as data store 410 (FIG. 4), and the index records in the index store, such as index store 420 (FIG. 4), in Uniqorn can be in the following record formats:

| Type | Tuple | Semantic |
|---|---|---|
| Data Record (DR) | {pk, aks, o, s, c} | pk: primary key; aks: set of the alternate keys; o: operation identification; s: record status; c: record content |
| Index Record (IR) | {ak, pk, o} | ak: alternate/alternate key; pk: primary key; o: operation identification |

To make operations non-blocking, in many embodiments, Uniqorn can be configured to implement each operation as a client-driven workflow (instead of a server-managed transaction) that consists of one or more primitive get/put/delete operations, as above, on underlying data store and/or index store. In these embodiments, a workflow runs optimistically (thus non-blocking) and can abort due to system failures and/or interleaving of concurrent workflows, leaving index records and data records inconsistent.

To resolve any potential inconsistency, in many embodiments, Uniqorn can be configured to treat data store as the ground of truth and data store writes as linearization points of operations. Due to this, Uniqorn can be configured to address only the inconsistencies in index store.

In these embodiments, there are two kinds of index records that can be inconsistent/invalid with data store: garbage index records and missing index records:

Garbage index record. An index record is garbage if it exists in index store but the data record to which it refers either does not exist in data store or does not have the alternate key of the index record.

Missing index record. An index record is missing when it does not exist in index store but some existing data record in data store has the alternate key of the index record.

Missing index records can cause anomalies and can be found or generated by three causes: lost updates, read skews, and unsafe garbage index record cleanups.

Lost Updates.

Suppose two concurrent operations P and C (from the same or different clients) try to update the same data record. P adds a new alternate key to the data record while C removes an existing alternate key from the set of alternate keys of the data record. Both P and C may succeed, yet the resulting data record may be different depending on their relative order. However, from application's perspective, P, for example, may keep running while mistakenly assume that the data record already has the added alternate key (which may have been overwritten by C and therefore lost), leading to missing index record and unexpected business consequence. Similarly, an index record can be updated or deleted by concurrent operations, leading to missing index record as well.

To prevent lost updates, in many embodiments, Uniqorn can augment every index record and every data record with an operation identification column (OpID), which is used as the conditional for a primitive conditional write on underlying data or index store (e.g., insert/condUpdate/condDelete, see above). In these embodiments, an OpID is an ordered pair of {ts, cid} where ts is a local timestamp at client of identification cid. In these embodiments, a new OpID is drawn as {nextTS( ), clientID( )}. Due to clock offsets among clients, OpIDs are comparable (based on their timestamps) only if they are drawn from the same client (thus have the same cid), i.e., for OpID Op and Oc of operation P and C, respectively, Op>Oc iff Op.ts>Oc.ts and Op.cid=Oc.cid. Since timestamps tick forward at each client and client identifications are globally unique, each OpID is globally unique.

To prevent lost updates, OpIDs can be used as conditionals to guard against concurrent interfering operations:

conditional write of index records and data records. Every data record write bears a new (globally unique) OpID among all data records. Similarly, every index record write bears a new (globally unique) OpID among all index records. A data record or index record is updated or deleted successfully only if its OpID has not been changed.

Read Skews.

Assume that an index record of a given alternate key is missing, a read by the alternate key will not find a matching index record and thus return empty to application even if an existing data record in the ground-of-truth data store does have the alternate key. However, a read by the primary key of the data record will return the existing data record, leading to inconsistent results between the two reads. To prevent skewed reads, in many embodiments, Uniqorn can be configured to orderly persist or delete a data record along with its index records:

pre persist index records. An attempt to add an alternate key to a data record can persist the index record of the alternate key before persisting the data record.

post-delete index records. An attempt to remove an alternate key from a data record can delete it from the data record in data store before deleting the index record of the alternate key.

However, when a client fails to persist the data record after successfully persisting its index records (or similarly, a client fails to delete the corresponding index records after successfully removing the alternate key from the data record or removing the data record at all), the index record can become garbage. The occurrence of these garbage is unavoidable due to failures. Nevertheless, in some embodiments, Uniqorn can tolerate garbage index records internally, but clients can hide them from applications:

hide garbage index records. A client serving a get operation by an alternate key from application can return the data record only if it exists in data store and has the alternate key.

Unsafe Garbage Index Record Cleanups.

Though tolerant to garbage index records, in many embodiments, Uniqorn can be configured to automatically delete the garbage index records since either they accumulate to take significant amount of space and performance cost or the alternate keys of garbage index records have to be reused by another data record. However, deleting garbage index records may lead to missing index records. Suppose that an index record has been persisted in index store by an ongoing insert or update operation that has not persisted the data record referred by the index record into data store. On one hand, when such an ongoing insert or update later persists the data record successfully, this persisted index record can transition from garbage to valid. If such a transitional index record is unsafely deleted by a garbage cleanup operation, the index record is missing.

On the other hand, when the ongoing insert or update fails (e.g., due to system failures) to persist the data record, the previous persisted index record can become garbage (which can be safely deleted). However, it is ambiguous whether a garbage index record was persisted by an ongoing or failed insert or update operation.

Examples of races between persistor P and collector C can include: P adds alternate key X to the data record of primary key 1 with new OpID Op; and C garbage-collects with new OpID Oc. In the exemplary races (a), (b), and (c) below, a reference data record {1, 0, Or} exists without alternate keys initially. P first adds index record {X, 1, Op}, then C reads index record {X, 1, Op}. Afterwards, they begin to race.

(a) C finds the valid index record added by P, aborts itself: After P updates data record {1, 0, Or} to {1, {X}, Op}, C finds {X, 1, Op} is valid after reading {1, {X}, Op} and therefore abort.

| Action | | Data Store {pk, aks, o} | Index Store {ak, pk, o} |
|---|---|---|---|
| | | {1, 0, $O_r$} | |
| P | add {X, 1, $O_p$} for alternate key X | {1, 0, $O_r$} | {X, 1, $O_p$} |
| C | read {X, 1, $O_p$} | {1, 0, $O_r$} | {X, 1, $O_p$} |
| P | update {1, 0, $O_r$} to {1, {X}, $O_p$}, ok! | {1, {X}, $O_p$} | {X, 1, $O_p$} |
| C | read {1, {X}, $O_p$} ⟹ {X, 1, $O_p$} is valid, abort! | {1, {X}, $O_p$} | {X, 1, $O_p$} |

(b) C fails to effectively abort P, aborts itself: C finds {X, 1, Op} is garbage after reading {1, 0, Or}, then attempts to delete it by first updating {1, 0, Or} to {1, {X}, Oc} (to effectively abort P). However, P updates data record {1, 0, Or}, to {1, {X}, Op} before C's attempt, forcing C to abort.

| Action | | Data Store {pk, aks, o} | Index Store {ak, pk, o} |
|---|---|---|---|
| | | {1, 0, $O_r$} | |
| P | add {X, 1, $O_p$} for alternate key X | {1, 0, $O_r$} | {X, 1, $O_p$} |
| C | read {X, 1, $O_p$} | {1, 0, $O_r$} | {X, 1, $O_p$} |
| C | read {1, 0, $O_r$} ⟹ {X, 1, $O_p$} is garbage | {1, 0, $O_r$} | {X, 1, $O_p$} |
| P | update {1, 0, $O_r$} to {1, {X}, $O_p$}, ok! | {1, {X}, $O_p$} | {X, 1, $O_p$} |
| C | update {1, 0, $O_r$} to {1, {X}, $O_c$}, abort! | {1, {X}, $O_p$} | {X, 1, $O_p$} |

(c) C effectively aborts P, deletes the garbage index record: C's attempt succeeds and effectively aborts P, thereafter P continues to update {1, 0, Or} to {1, {X}, Op}, and fails. At the end, C can safely delete {X, 1, Op}, provided that no operation has reused the alternate key X (therefore changed its OpID).

| Action | | Data Store {pk, aks, o} | Index Store {ak, pk, o} |
|---|---|---|---|
| | | {1, 0, $O_r$} | |
| P | add {X, 1, $O_p$} for alternate key X | {1, 0, $O_r$} | {X, 1, $O_p$} |
| C | read {X, 1, $O_p$} | {1, 0, $O_r$} | {X, 1, $O_p$} |
| C | read {1, 0, $O_r$} ⟹ {X, 1, $O_p$} is garbage | {1, 0, $O_r$} | {X, 1, $O_p$} |
| C | update {1, 0, $O_r$} to {1, {X}, $O_c$}, ok! | {1, 0, $O_c$} | {X, 1, $O_p$} |
| P | update {1, 0, $O_r$} to {1, {X}, $O_p$}, abort! | {1, 0, $O_c$} | {X, 1, $O_p$} |
| C | delete {X, 1, $O_p$} | {1, 0, $O_c$} | |

To facilitate the resolution of the ambiguity, in many embodiments, OpIDs can be reused for an index record cleanup operation to effectively abort the ongoing operation that has added/updated the index record definitively.

restricted indexing. On one side, for each operation ("persistor") that adds or updates an alternate key to a data record, a new OpID is assigned to this persistor. Moreover, the index record to be added or updated (as the result of adding or updating the alternate key) will bear this OpID and be persisted in index store. If the index record with the same alternate key exists, it may be valid or garbage. Only if it is garbage (then the "conservative deindexing" is called to safely delete it), the alternate key can be reused, otherwise violating the uniqueness constraint. At the end, the data record will be updated with both the same OpID and the added or updated alternate key, conditional on that the OpID of the before-update data record has been the same since this persistor begins (i.e., no other concurrent operation has changed the data record). If no before-update data record exists (e.g., in the case of inserting a new data record with alternate keys), a placeholder/dummy data record with both a new OpID and an empty set of alternate keys is persisted initially as the before-insert data record.

conservative deindexing. On the other side, for each operation ("collector") that attempts to delete a retrieved index record, the data record referred by the index record is retrieved and checked if the index record is garbage (Table 4). The collector will abort if it is valid. To effectively abort a potential ongoing operation (persistor) that may have added or updated the garbage index record, the collector will update the OpID of the data record referred by the garbage index record to a new OpID (while keeping all other columns unchanged). If such the persistor eventually continues to update the data record, it will definitively fail due to the changed OpID of the before-update (or before-insert) data record. If the persistor has already been effectively aborted, e.g., the data record referred by the garbage index record is deleted or has an OpID greater than the OpID of the index record, the collector does not need to abort the persistor again. At the end, the collector can safely delete the index record, conditional on that the OpID of the before-delete index record has not been changed since it has been retrieved at the beginning.

In many embodiments, with the capability to safely delete a garbage index record by first effectively aborting the ongoing operation (persistor) that added or updated it, Uniqorn can now safely reuse the alternate key of any garbage index record by first safely deleting the garbage index record and then inserting back a new index record that refers to a different data record, without violating the uniqueness constraint.

Turning ahead in the drawings, FIGS. 19-20 show an exemplary program for APIs for a client, according to an embodiment. In many embodiments, the APIs shown in FIGS. 19-20 can comprise methods for creating or updating a data record (e.g., put), reading a data record (e.g., getByPK and getByAK), deleting a data record (e.g., deleteByPK, deleteByAK, deleteByDR, and gcDR), and cleaning up a garbage index record (e.g., gcIR). The APIs are merely exemplary and are not limited to the embodiments presented herein. The APIs can be employed in many different embodiments or examples not specifically depicted or described herein. In some embodiments, the procedures, the processes, and/or the activities of the APIs can be performed in the order presented. In other embodiments, the procedures, the processes, and/or the activities of the APIs can be performed in any suitable order. In still other embodiments, one or more of the procedures, the processes, and/or the activities of the APIs can be combined or skipped. In many embodiments, database management system 310 (FIG. 3) and/or client 432 (FIG. 4) can be suitable to perform the APIs and/or one or more of the activities of the APIs.

In many embodiments, Uniqorn clients, such as client 432 (FIG. 4), can implement get (getByPK and getByPK), put, and delete (deleteByPK, deleteByAK, and deleteByDR) operations that are callable by applications, such as application 431 (FIG. 4), and internal gcIR and gcDR operations for garbage collection. The internal operations are callable by get/put/delete operations as well. A single put operation can serve two purposes: insert a new data record or update an existing data record. In these embodiments, all operations are implemented without time-outs, backoffs, and retries, but return specific exceptions to applications. Customer-facing applications usually have tight operation deadlines and are more suitable to handle exceptions to achieve best customer experience.

In the exemplary embodiments, a special status column is used to distinguish the two states of a data record: dummy and live (line 2). In other embodiments, the status can be a single bit and can be incorporated into OpIDs. In many embodiments, a dummy data record can be used as a reference data record for a put operation that inserts a new data record without incurring missing index records. In these or other embodiments, a dummy data record does not have any alternate key and can be deleted directly (line 77-79), which can, however, effectively abort the ongoing put operation (persistor) that inserted the dummy data record. In many embodiments, dummy data records are hidden from applications by clients. All metadata columns (i.e., OpID and status columns) in these embodiments are opaque to applications. In these embodiments, async keyword (e.g., lines 10, 19) is used to indicate an asynchronous and best-effort action whose execution and result does not block or affect the following actions.

In these embodiments, GetByPK (line 7-13) can directly call the underlying data store get primitive (due to the ground-of-truth nature of data store); however the retrieved data record can be returned to applications only if it is not a dummy. When the retrieved data record is a dummy, the dummy in these embodiments can be deleted at best-effort. In these embodiments, getByAK can be implemented as a two-step lookup (line 14-21). If no index record of a given alternate key exists, getByAK in these embodiments can return nil directly without further looking up data store since index records are never missed in index store. In these embodiments, the retrieved data record referred by the found index record is returned only if it is not a dummy and has the given alternate key. Otherwise, in these embodiments, the found index record can be determined to be garbage and will be cleaned up at best-effort by calling the internal garbage collection operation gcIR.

In these embodiments, a put operation (persistor) (line 22-45) can be used to insert a new data record or update an existing data record along with its index records. If the OpID of the data record to put is nil or empty, it means to insert it as a new data record and otherwise to update an existing data record. Every put operation of a data record in these embodiments can bear a new OpID. On one side, if the data record to be inserted does not have alternate key or the data record to be updated does not add new alternate keys or change existing alternate keys, the put operation does not need to access index store. On the other side, the existing data record will be taken as the reference data record, or a dummy data record is inserted as the reference data record.

In these embodiments, the insertion of dummy data record can be necessary since the associated index records added subsequently are garbage and may be deleted before the data record is successfully inserted, leading to missing index records. Then, index records corresponding to the newly added/updated alternate keys are persisted in parallel into index store (line 38), bearing the same OpID as the put operation. If an alternate key to be added has been owned by a different data record, the put operation has to abort to comply with the uniqueness constraints. Otherwise, it can be reused by the data record only after the garbage index record is safely deleted by calling a gcIR operation (collector). A shortcut exists (line 50) when the found index record refers to the same data record of this put operation (e.g., a succession of retries), the put operation with a greater OpID wins and directly updates the OpID of the index record while the other aborts. At the end, the data record, bearing the OpID of the put operation, is updated provided that no concurrent operations have updated the reference data record since the beginning of this put operation. Thereafter, the index records corresponding to the overwritten or deleted alternate keys, if any, are left as garbage and collected at best-effort.

Similar to getByPK, deleteByPK in these embodiments can directly call delete primitive to delete the data record (due to the ground-of-truth nature of data store), leaving all of its index records as garbage. However, deleteByPK (line 56-59) in these embodiments retrieves the data record first, then calls deleteByDR to delete it, and at the end collects resulting garbage index records at best-effort. Similar to getByAK, deleteByAK (line 60-68) takes a two-step lookup to find and then delete the data record, if any, and to collect the matching index record at best-effort, if suspected as garbage. An internal garbage index record collection operation gcIR (collector) (line 80-92) can be used to delete a suspicious garbage index record. It will abort if the referred data record does own the alternate key of the index record. Otherwise, it will effectively abort the possibly ongoing put operation (persistor) that has added the index record by updating the OpID of the referred data record to a new OpID, then delete the garbage index record. Two shortcuts exist in these embodiments. When the referred data record does not exist or when it has a greater OpID than the OpID of the index record, the persistor has already been effectively aborted, so the gcIR can directly delete the garbage index record.

Figure 21:
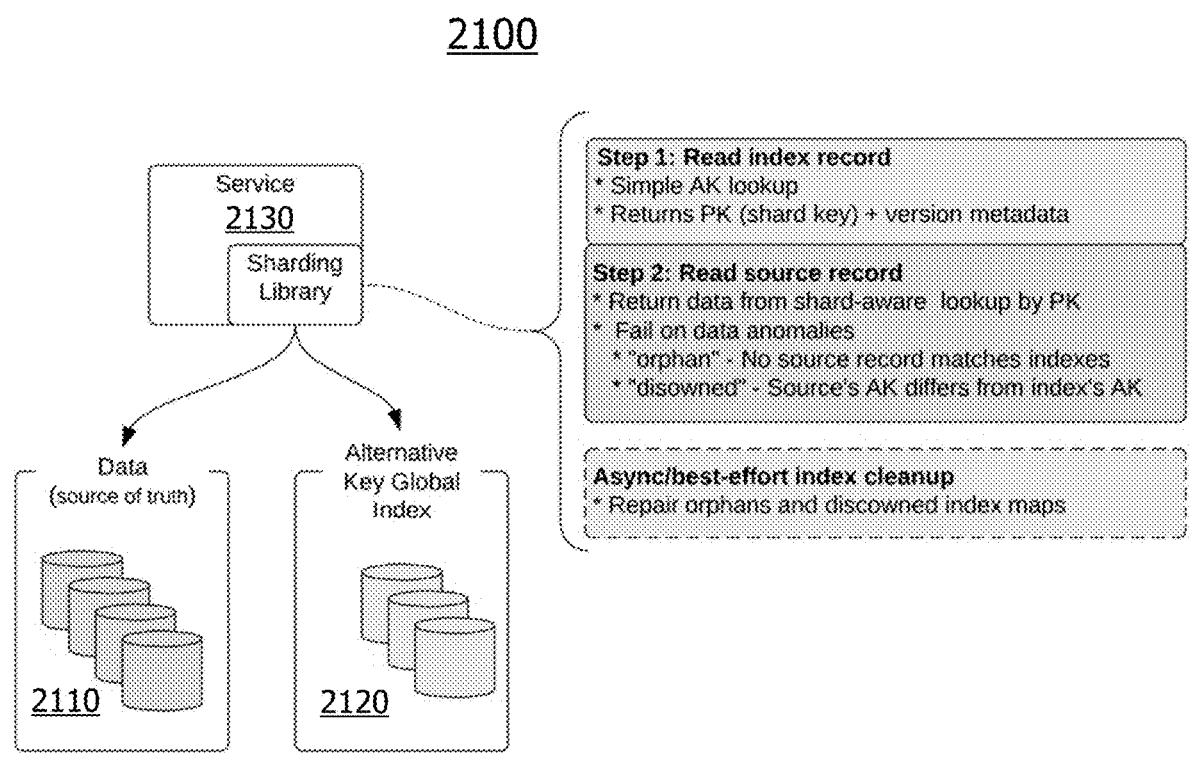
FIG. 21 illustrates a system and functions to be performed for reading a data/source record in a sharded database based on an alternate key, according to an embodiment.

Turning ahead in the drawings, FIG. 21 illustrates a block diagram of a system 2100 that can be employed for reading data records in a sharded database, as described in greater detail below. System 2100 is merely exemplary and embodiments of the system are not limited to the embodiments presented herein. System 2100 can be employed in many different embodiments or examples not specifically depicted or described herein. In some embodiments, certain elements or modules of system 2100 can perform various procedures, processes, and/or activities. In these or other embodiments, the procedures, processes, and/or activities can be performed by other suitable elements or modules of system 2100.

Generally, therefore, system 2100 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 2100 described herein.

In some embodiments, system 2100 can include data store 2110, alternative key global index store 2120, and service 2130. In many embodiments, data store 2110 can be configured to split data records, such as customer data or transaction records, based on the primary keys of the data records, such as unique customer IDs or transaction serial numbers, and store the data records into more than one shards/partitions of a sharded database. In many embodiments, alternative key global index store 2120 can be configured to store index records, including global secondary indexes. In some embodiments, the index records in alternative key global index store 2120 also can be divided and saved in the sharded database.

In some embodiments, service 2130 can be configured to read, create, update, and/or delete data through a database management system, such as sharding library or database management system 310 (FIG. 3), configured to get, put, and/or delete data records in the data store 2110. In many embodiments, service 2130 can read data records by executing APIs, such as the APIs in FIGS. 5-8 or FIGS. 19-20, or other similar programs on one or more processors. Furthermore, data store 2110, an index store 2120, and service 2130 can each be a computer system, such as computer system 100 (FIG. 1), as described above, and can each be a single computer, a single server, or a cluster or collection of computers or servers, or a cloud of computers or servers. In another embodiment, a single computer system can host each of two or more of data store 2110, an index store 2120, and service 2130.

Figure 22:
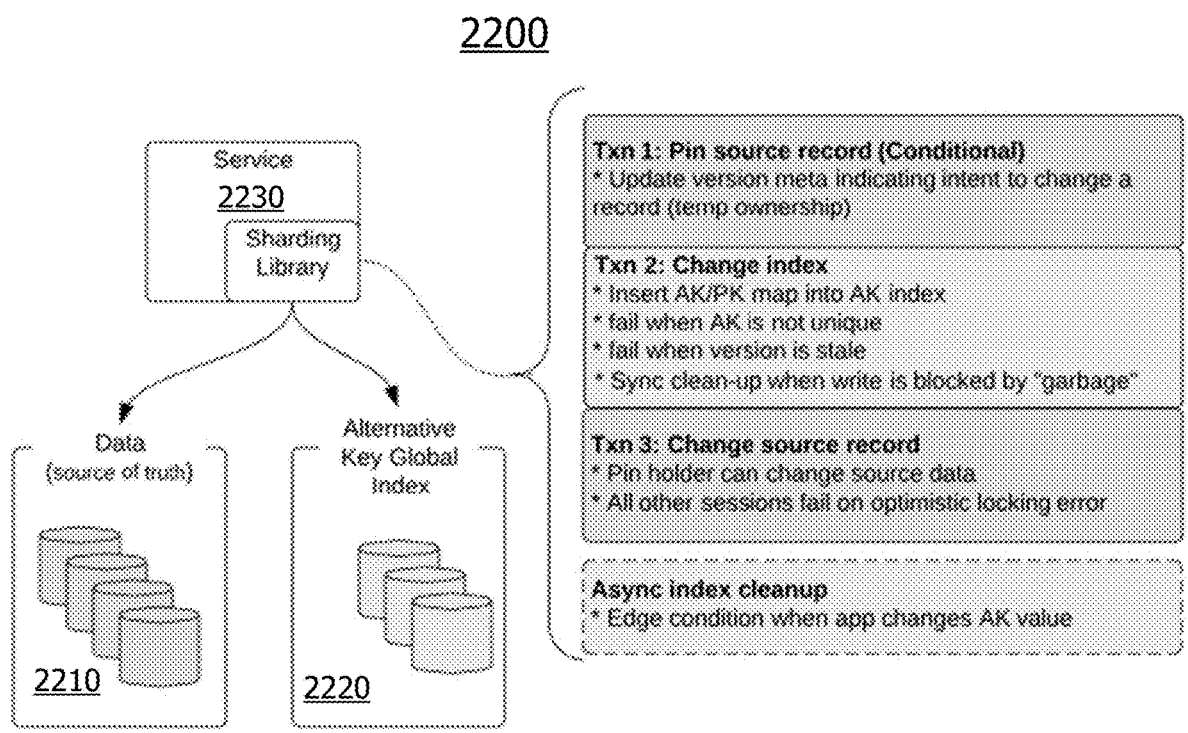
FIG. 22 illustrates a system and functions to be performed for writing a data/source record into a sharded database, according to an embodiment.

Turning ahead in the drawings, FIG. 22 illustrates a block diagram of a system 2200 that can be employed for inserting or updating data records in a sharded database, as described in greater detail below. System 2200 is merely exemplary and embodiments of the system are not limited to the embodiments presented herein. System 2200 can be employed in many different embodiments or examples not specifically depicted or described herein. In some embodiments, certain elements or modules of system 2200 can perform various procedures, processes, and/or activities. In these or other embodiments, the procedures, processes, and/or activities can be performed by other suitable elements or modules of system 2200.

Generally, therefore, system 2200 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 2200 described herein.

In some embodiments, system 2200 can include data store 2210, alternative key global index store 2220, and service 2230. In many embodiments, data store 2210 can be configured to split data records, such as customer data or transaction records, based on the primary keys of the data records, such as unique customer IDs or transaction serial numbers, and store the data records into more than one shards/partitions of a sharded database. In many embodiments, alternative key global index store 2220 can be configured to store index records, including global secondary indexes. In some embodiments, the index records in alternative key global index store 2220 also can be divided and saved in the sharded database.

In some embodiments, service 2230 can be configured to read, create, update, and/or delete data through a database management system, such as sharding library or database management system 310 (FIG. 3), configured to get, put, and/or delete data records in the data store 2210. In many embodiments, service 2230 can insert or update data records by executing APIs, such as the APIs in FIGS. 5-8 or FIGS. 19-20, or other similar programs on one or more processors. Furthermore, data store 2210, an index store 2220, and service 2230 can each be a computer system, such as computer system 100 (FIG. 1), as described above, and can each be a single computer, a single server, or a cluster or collection of computers or servers, or a cloud of computers or servers. In another embodiment, a single computer system can host each of two or more of data store 2110, an index store 2220, and service 2230.

Furthermore, in many embodiments, Uniqorn also can support non-unique indexes. In these embodiments, Uniqorn can identify an index record by the composite key comprising of both the secondary key column and the primary key column. Index records are sharded by secondary keys, but uniquely indexed in each shard by composite keys. Therefore, Uniqorn in these embodiments can allow multiple index records to share the same secondary key but refer to different data records. The only changes in the APIs, compared to those in the prior embodiments, such as APIs 19-20, are getByAK and put operations. For a getByAK operation, multiple retrieved index records of a given secondary key, instead of at most one index record, may be returned. Their referred data records can be retrieved in parallel and checked if they have the secondary key before returning them to application. A put operation that needs to add an index record will not trigger any garbage collection no matter whether index records with the same secondary key have already existed in index store or not. Data records can have mixed set of unique and non-unique secondary keys while still prevent missing index records.

In some embodiments, Uniqorn also can support covering indexes. In these embodiments, covering columns can be added into index records to accommodate frequently read attributes. Moreover, a flag "sync" column can be added to indicate whether covering columns are in-sync with those of the data record. A client in these embodiments can, before persisting a data record, either optimistically write ahead both the flag and covering columns into associated index records, or pessimistically write back them at best-effort after persisting the data record. In the optimistic manner, the sync flag is marked as "may-be-dirty" and covering columns are pre-updated. If the data record is successfully persisted later, the flag will be marked as "up-to-date" at best-effort. In the pessimistic manner, the flag is marked as "may-be-stale" first without updating any of covering columns. If the data record is successfully persisted later, the flag will be marked as "up-to-date" along with covering columns back-filled in a single write. A getByAK operation will return the frequently-read attributes directly from covering columns of index records if their flags are "up-to-date", but will resort to referred data records otherwise.

In an embodiment, a system can comprise one or more processors; and one or more non-transitory computer-readable media storing computing instructions configured to run on the one more processors and perform a method for inserting or updating a data record in a sharded database. In this embodiment, the method can comprise: receiving a request for a write operation of an input record in a data store associated with a sharded database and an alternate-key-global-index (AKGI) database; generating a new optimistic lock value, the new optimistic lock value being unique in the sharded database; when the data store does not include a data record associated with the input record, creating the dummy data record in the data store; locking the data record for the write operation by setting the DROpLock of the data record to the new optimistic lock value; and performing the write operation of the input record in the AKGI database and the sharded database.

In this embodiment, the input record can comprise an input primary key (IPK), an input optimistic lock (IOpLock), and an input alternate key (IAK). In this embodiment, the data record can comprise a data record primary key (DRPK), a data record optimistic lock (DROpLock), a data record alternate key (DRAK), and a data record status. In this embodiment, at the time the dummy data record is created, the DRPK of the data record is set as the IPK of the input record; and the data record status of the data record is set as Dummy.

In this embodiment, the write operation of the input record is performed by: (a) when the IAK of the input record is not empty, determining whether the AKGI database includes an index record associated with the data record; (b) when the AKGI database includes the an index record associated with the data record: determining whether the index record is locked for the write operation by confirming whether an index record optimistic lock (IROpLock) of the index record is less than the new optimistic lock value; and when the index record in the AKGI database is determined to be locked for the write operation, performing the write operation of the input record in the AKGI database by modifying the index record in the AKGI database based on the input record and the new optimistic lock value; (c) when (A) the IAK of the input record is not empty, and (B) the AKGI database does not include the index record associated with the data record, performing the write operation of the input record in the AKGI database by inserting the index record associated with the input record and the new optimistic lock value; and (d) when one of (A) the IAK of the input record is empty, or (B) the write operation of the input record in the AKGI database is successful, modifying the data record in the sharded database based on the input record.

Although systems and methods for managing sharded database have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of the figures and flow charts may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  receiving a request for a write operation of an input record in a data store associated with a sharded database and an alternate-key-global-index (AKGI) database, wherein:
    the input record comprises an input primary key (IPK), an input optimistic lock (IOpLock), and an input alternate key (IAK);
  generating a new optimistic lock value, the new optimistic lock value being unique in the sharded database;
  when the data store does not include a data record associated with the input record, creating the data record in the data store, wherein:
    the data record comprises a data record primary key (DRPK), a data record optimistic lock (DROpLock), a data record alternate key (DRAK), and a data record status;
    the DRPK of the data record is set as the IPK of the input record; and
    the data record status of the data record is set as Dummy;
  locking the data record for the write operation by setting the DROpLock of the data record to the new optimistic lock value;

performing the write operation of the input record in the AKGI database based at least in part on the new optimistic lock value by:
  when the IAK of the input record is not empty, determining whether the AKGI database includes an index record associated with the data record;
  when the AKGI database is determined to include the index record associated with the data record:
    determining whether the index record is locked for the write operation by confirming whether an index record optimistic lock (IROpLock) of the index record is less than the new optimistic lock value; and
    when the index record in the AKGI database is determined to be locked for the write operation, modifying the index record in the AKGI database based on the input record and the new optimistic lock value; and
  when (a) the IAK of the input record is not empty, and (b) the AKGI database does not include the index record associated with the data record, inserting the index record associated with the input record and the new optimistic lock value; and
after performing the write operation of the input record in the AKGI database, performing the write operation of the input record in the sharded database based at least in part on the new optimistic lock value by:
  when one of (a) the IAK of the input record is empty, or (b) the write operation of the input record in the AKGI database is successful, modifying the data record in the sharded database based on the input record.

2. The system of claim 1, wherein:
the computing instructions are further configured to perform:
  determining that the data record in the data store is locked for the write operation based on one of:
    (a) whether the IOpLock of the input record is empty and the data record status of the data record is not Live;
    (b) whether the IOpLock of the input record is not empty and the DROpLock of the data record matches the new optimistic lock value; or
    (c) whether the DROpLock of the data record matches the new optimistic lock value and the data record status of the data record is not Live.

3. The system of claim 1, wherein:
the index record comprises an index record alternate key hash (IRAK-Hash), an index record primary key (IRPK), and the IROpLock; and
the AKGI database is determined to include the index record associated with the data record when:
  the IRAK-Hash of the index record is associated with the IAK of the input record; and
  the IRPK of the index record is equal to the IPK of the input record.

4. The system of claim 1, wherein:
the index record comprises an index record alternate key hash (IRAK-Hash), an index record primary key (IRPK), and the IROpLock;
determining whether the AKGI database includes the index record associated with the data record further comprises:
  when (a) the IRAK-Hash of the index record is associated with the IAK of the input record, and (b) the IRPK of the index record is different from the IPK of the input record, asynchronously deleting the index record; and
performing the write operation of the input record in the sharded database further comprises:
  when modifying the data record in the sharded database based on the input record is not successful, asynchronously deleting the index record.

5. The system of claim 1, wherein:
the index record comprises an index record alternate key hash (IRAK-Hash), an index record primary key (IRPK), and the IROpLock; and
the index record is determined to be locked for the write operation based on one of:
  (a) whether the AKGI database does not include the index record, wherein the IRAK-Hash of the index record is associated with the IAK of the input record;
  (b) whether the IRAK-Hash of the index record in the AKGI database is associated with the IAK of the input record, the IRPK of the index record in the AKGI database is equal to the IPK of the input record, and the IROpLock of the index record is less than the new optimistic lock value; or
  (c) whether the IRAK-Hash of the index record in the AKGI database is associated with the IAK of the input record and IRPK of the index record is different from the IAK of the input record.

6. The system of claim 1, wherein:
the new optimistic lock value comprises a client identification and a timestamp;
generating the new optimistic lock value comprises:
  setting the client identification of the new optimistic lock value as a client identification associated with the request; and
  setting the timestamp of the new optimistic lock value as a client timestamp associated with the request; and
when a client identification of the IROpLock of the index record is different from the client identification of the new optimistic lock value, the IROpLock of the index record is not less than the new optimistic lock value.

7. The system of claim 1, wherein:
the new optimistic lock value comprises a primary key, an epoch, and a version; and
generating the new optimistic lock value comprises:
  setting the primary key of the new optimistic lock value as the IPK of the input record;
  when the IOpLock of the input record is empty:
    setting the epoch of the new optimistic lock value as a randomly generated value; and
    setting the version of the new optimistic lock value to zero; and
  when the IOpLock of the input record is not empty:
    incrementing the version of the new optimistic lock value.

8. The system of claim 1, wherein:
the index record comprises an index record alternate key hash (IRAK-Hash), an index record primary key (IRPK), and the IROpLock; and
the computing instructions are further configured to perform:
  asynchronously deleting the index record when one of:
    (a) the AKGI database includes the index record, and the data store does not include a first corresponding data record, wherein a DRAK of the first corresponding data record is associated with the IRAK-Hash of the index record, and a data record status of the first corresponding data record is Live; or (b) the AKGI database includes the index record, and the data store includes a second corresponding data record, wherein a DRAK of the second corresponding data record is associated with the IRAK-Hash of the index record, and a DRPK of the second corresponding data record is different from the IRPK of the index record.

9. The system of claim 1, wherein:
the computing instructions are further configured to perform:
when (a) the data store contains an existing data record with a DRAK associated with the IAK of the input record, (b) a DRPK of the existing data record is different from the IPK of the input record, and (c) a data record status of the existing data record is Live, aborting the write operation of the input record.

10. The system of claim 1, wherein:
the computing instructions are further configured to perform:
receiving a second request for a delete operation of a second input record from the data store associated with the sharded database; and
performing the delete operation of the second input record by:
determining whether the data store includes a second data record in the data store associated with the second input record;
when the data store is determined to include the second data record in the data store associated with the second input record:
determining whether the second data record in the data store is locked for the delete operation; and
when the second data record in the data store is determined to be locked for the delete operation, deleting the second data record from the data store; and
when one of (a) the data store is determined to not include the second data record in the data store associated with the second input record, or (b) after deleting the second data record from the data store is successful, asynchronously deleting a second index record in the AKGI database associated with the second input record.

11. A method being implemented via execution of computing instructions configured to run at one or more processors and stored at one or more non-transitory computer-readable media, the method comprising:
receiving a request for a write operation of an input record in a data store associated with a sharded database and an alternate-key-global-index (AKGI) database, wherein:
the input record comprises an input primary key (IPK), an input optimistic lock (IOpLock), and an input alternate key (IAK);
generating a new optimistic lock value, the new optimistic lock value being unique in the sharded database;
when the data store does not include a data record associated with the input record, creating the data record in the data store, wherein:
the data record comprises a data record primary key (DRPK), a data record optimistic lock (DROpLock), a data record alternate key (DRAK), and a data record status;

the DRPK of the data record is set as the IPK of the input record; and
the data record status of the data record is set as Dummy;
locking the data record for the write operation by setting the DROpLock of the data record to the new optimistic lock value;
performing the write operation of the input record in the AKGI database based at least in part on the new optimistic lock value by:
when the IAK of the input record is not empty, determining whether the AKGI database includes an index record associated with the data record;
when the AKGI database is determined to include the index record associated with the data record:
determining whether the index record is locked for the write operation by confirming whether an index record optimistic lock (IROpLock) of the index record is less than the new optimistic lock value; and
when the index record in the AKGI database is determined to be locked for the write operation, modifying the index record in the AKGI database based on the input record and the new optimistic lock value; and
when (a) the IAK of the input record is not empty, and (b) the AKGI database does not include the index record associated with the data record, inserting the index record associated with the input record and the new optimistic lock value; and
after performing the write operation of the input record in the AKGI database, performing the write operation of the input record in the sharded database based at least in part on the new optimistic lock value by:
when one of (a) the IAK of the input record is empty, or (b) the write operation of the input record in the AKGI database is successful, modifying the data record in the sharded database based on the input record.

12. The method of claim 11 further comprising determining that the data record in the data store is locked for the write operation based on one of:
(a) whether the IOpLock of the input record is empty and the data record status of the data record is not Live;
(b) whether the IOpLock of the input record is not empty and the DROpLock of the data record matches the new optimistic lock value; or
(c) whether the DROpLock of the data record matches the new optimistic lock value and the data record status of the data record is not Live.

13. The method of claim 11, wherein:
the index record comprises an index record alternate key hash (IRAK-Hash), an index record primary key (IRPK), and the IROpLock; and
the AKGI database is determined to include the index record associated with the data record when:
the IRAK-Hash of the index record is associated with the IAK of the input record; and
the IRPK of the index record is equal to the IPK of the input record.

14. The method of claim 11, wherein:
the index record comprises an index record alternate key hash (IRAK-Hash), an index record primary key (IRPK), and the IROpLock;
determining whether the AKGI database includes the index record associated with the data record further comprises:

when (a) the IRAK-Hash of the index record is associated with the IAK of the input record, and (b) the IRPK of the index record is different from the IPK of the input record, asynchronously deleting the index record; and
performing the write operation of the input record in the sharded database further comprises:
when modifying the data record in the sharded database based on the input record is not successful, asynchronously deleting the index record.

15. The method of claim 11, wherein:
the index record comprises an index record alternate key hash (IRAK-Hash), an index record primary key (IRPK), and the IROpLock; and
the index record is determined to be locked for the write operation based on one of:
  (a) whether the AKGI database does not include the index record, wherein the IRAK-Hash of the index record is associated with the IAK of the input record;
  (b) whether the IRAK-Hash of the index record in the AKGI database is associated with the IAK of the input record, the IRPK of the index record in the AKGI database is equal to the IPK of the input record, and the IROpLock of the index record is less than the new optimistic lock value; or
  (c) whether the IRAK-Hash of the index record in the AKGI database is associated with the IAK of the input record and IRPK of the index record is different from the IAK of the input record.

16. The method of claim 11, wherein:
the new optimistic lock value comprises a client identification and a timestamp;
generating the new optimistic lock value comprises:
  setting the client identification of the new optimistic lock value as a client identification associated with the request; and
  setting the timestamp of the new optimistic lock value as a client timestamp associated with the request; and
when a client identification of the IROpLock of the index record is different from the client identification of the new optimistic lock value, the IROpLock of the index record is not less than the new optimistic lock value.

17. The method of claim 11, wherein:
the new optimistic lock value comprises a primary key, an epoch, and a version; and
generating the new optimistic lock value comprises:
  setting the primary key of the new optimistic lock value as the IPK of the input record;
  when the IOpLock of the input record is empty:
    setting the epoch of the new optimistic lock value as a randomly generated value; and
    setting the version of the new optimistic lock value to zero; and
  when the IOpLock of the input record is not empty:
    incrementing the version of the new optimistic lock value.

18. The method of claim 11, wherein:
the index record comprises an index record alternate key hash (IRAK-Hash), an index record primary key (IRPK), and the IROpLock; and
the computing instructions are further configured to perform:
  asynchronously deleting the index record when one of:
    (a) the AKGI database includes the index record, and the data store does not include a first corresponding data record, wherein a DRAK of the first corresponding data record is associated with the IRAK-Hash of the index record, and a data record status of the first corresponding data record is Live; or
    (b) the AKGI database includes the index record, and the data store includes a second corresponding data record, wherein a DRAK of the second corresponding data record is associated with the IRAK-Hash of the index record, and a DRPK of the second corresponding data record is different from the IRPK of the index record.

19. The method of claim 11 further comprising:
when (a) the data store contains an existing data record with a DRAK associated with the IAK of the input record, (b) a DRPK of the existing data record is different from the IPK of the input record, and (c) a data record status of the existing data record is Live, aborting the write operation of the input record.

20. The method of claim 11 further comprising:
receiving a second request for a delete operation of a second input record from the data store associated with the sharded database; and
performing the delete operation of the second input record by:
  determining whether the data store includes a second data record in the data store associated with the second input record;
  when the data store is determined to include the second data record in the data store associated with the second input record:
    determining whether the second data record in the data store is locked for the delete operation; and
    when the second data record in the data store is determined to be locked for the delete operation, deleting the second data record from the data store; and
  when one of (a) the data store is determined to not include the second data record in the data store associated with the second input record, or (b) after deleting the second data record from the data store is successful, asynchronously deleting a second index record in the AKGI database associated with the second input record.

* * * * *